US012655993B2

(12) United States Patent
Park

(10) Patent No.: US 12,655,993 B2
(45) Date of Patent: Jun. 16, 2026

(54) OIL MIST FILTERING APPARATUS, COOKING APPARATUS INCLUDING THE SAME, AND VENTILATION SYSTEM INCLUDING THE SAME

(71) Applicant: Samsung Electronics Co., Ltd., Suwon-si (KR)

(72) Inventor: Dahwe Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 647 days.

(21) Appl. No.: 18/061,269

(22) Filed: Dec. 2, 2022

(65) Prior Publication Data

US 2023/0098531 A1 Mar. 30, 2023

Related U.S. Application Data

(63) Continuation of application No. PCT/KR2022/004267, filed on Mar. 25, 2022.

(30) Foreign Application Priority Data

| Mar. 25, 2021 | (KR) | .......................... 10-2021-0038553 |
| Mar. 17, 2022 | (KR) | .......................... 10-2022-0033614 |
| Mar. 25, 2022 | (KR) | .......................... 10-2022-0037646 |

(51) Int. Cl.
F24C 15/20 (2006.01)
B01D 39/20 (2006.01)
(Continued)

(52) U.S. Cl.
CPC ...... F24C 15/2042 (2013.01); B01D 39/2027 (2013.01); B01D 46/0047 (2013.01);
(Continued)

(58) Field of Classification Search
None
See application file for complete search history.

(56) References Cited

U.S. PATENT DOCUMENTS

| 3,260,189 A | * | 7/1966 | Jensen | ................ F24C 15/2028 |
| | | | | 55/DIG. 36 |
| 3,807,148 A | * | 4/1974 | Fike | ....................... B01D 50/00 |
| | | | | 55/385.6 |

(Continued)

FOREIGN PATENT DOCUMENTS

| CN | 110986132 A | 4/2020 |
| CN | 112161309 A | 1/2021 |

(Continued)

OTHER PUBLICATIONS

International Search Report and Written Opinion of the International Searching Authority dated Jul. 21, 2022, in connection with International Application No. PCT/KR2022/004267, 7 pages.

*Primary Examiner* — Ko-Wei Lin

(57) ABSTRACT

Provided is a cooking apparatus including: a main body; and a ventilator comprising a ventilator body including an inlet configured to inhale air containing oil mist generated in a cooking process using a heating device, a blower configured to blow the inhaled air from the inlet; and an oil mist filter positioned inside the ventilator body, and configured to remove the oil mist by filtering the oil mist from the inhaled air.

18 Claims, 14 Drawing Sheets

(51) Int. Cl.

| | | |
|---|---|---|
| B01D 46/00 | (2022.01) | |
| B01D 46/12 | (2022.01) | |
| B01D 46/42 | (2006.01) | |
| B01D 53/00 | (2006.01) | |
| B03C 3/41 | (2006.01) | |
| B03C 3/47 | (2006.01) | |
| F24F 5/00 | (2006.01) | |

(52) U.S. Cl.

CPC ......... B01D 46/12 (2013.01); B01D 46/4263 (2013.01); B01D 53/002 (2013.01); B03C 3/41 (2013.01); B03C 3/47 (2013.01); F24F 5/0042 (2013.01); *B01D 2273/30* (2013.01); *B01D 2279/35* (2013.01)

(56) References Cited

U.S. PATENT DOCUMENTS

| | | | | |
|---|---|---|---|---|
| 4,900,341 | A * | 2/1990 | Csabai | F24C 15/20 |
| | | | | 55/DIG. 36 |
| 7,396,374 | B2 * | 7/2008 | Ranalli | B01D 45/04 |
| | | | | 55/DIG. 36 |
| 7,422,613 | B2 * | 9/2008 | Bockle | F24C 15/2035 |
| | | | | 55/318 |
| 9,835,339 | B2 * | 12/2017 | Min | F24C 15/2042 |
| 9,874,356 | B2 * | 1/2018 | Jeong | F24C 15/2028 |
| 2002/0073715 | A1 * | 6/2002 | Logan | B01D 5/0015 |
| | | | | 62/3.4 |
| 2007/0062513 | A1 | 3/2007 | Gagas | |

| | | | | |
|---|---|---|---|---|
| 2010/0051010 | A1 * | 3/2010 | Colburn | F24C 15/2028 |
| | | | | 126/299 D |
| 2010/0163549 | A1 * | 7/2010 | Gagas | F24C 15/2042 |
| | | | | 219/622 |
| 2018/0154372 | A1 * | 6/2018 | Ajemian | B01D 47/028 |
| 2018/0163975 | A1 * | 6/2018 | Jiang | F24C 15/2021 |
| 2018/0195808 | A1 * | 7/2018 | Lambertson | F24C 15/2021 |
| 2019/0299115 | A1 * | 10/2019 | Lopa | B01D 1/0082 |
| 2021/0025598 | A1 * | 1/2021 | Lee | F24F 13/082 |

FOREIGN PATENT DOCUMENTS

| | | | |
|---|---|---|---|
| EP | 1481200 | A2 | 12/2004 |
| JP | 62005034 | A * | 1/1987 |
| JP | 2002-340377 | A | 11/2002 |
| JP | 2005-525223 | A | 8/2005 |
| JP | 2008-064347 | A | 3/2008 |
| JP | 2012-177494 | A | 9/2012 |
| JP | 2013-194935 | A | 9/2013 |
| JP | 2020-143820 | A | 9/2020 |
| KR | 10-2005-0072194 | A | 7/2005 |
| KR | 10-2006-0047717 | A | 5/2006 |
| KR | 10-1486725 | B1 | 1/2015 |
| KR | 10-1533798 | B1 | 7/2015 |
| KR | 10-1539078 | B1 | 7/2015 |
| KR | 10-1712009 | B1 | 3/2017 |
| KR | 10-2018-0057051 | A | 5/2018 |
| KR | 10-2018-0071686 | A | 6/2018 |
| KR | 20-2018-0002348 | U | 8/2018 |
| KR | 10-2019-0004684 | A | 1/2019 |
| KR | 10-2020-0139850 | A | 12/2020 |
| WO | 2003072222 | A2 | 9/2003 |

* cited by examiner

UP

FRONT ← → REAR

DOWN

FRONT ←→ REAR

DOWN

REAR

RIGHT ←→ LEFT

FRONT

OIL MIST FILTERING APPARATUS, COOKING APPARATUS INCLUDING THE SAME, AND VENTILATION SYSTEM INCLUDING THE SAME

CROSS-REFERENCE TO RELATED APPLICATIONS

This application is a Bypass Continuation of International Application No. PCT/KR2022/004267, filed Mar. 25, 2022, which claims priority to Korean Patent Application No. 10-2021-0038553, filed Mar. 25, 2021, Korean Patent Application No. 10-2022-0033614, filed Mar. 17, 2022, and Korean Patent Application No. 10-2022-0037646, filed Mar. 25, 2022, the disclosures of which are herein incorporated by reference in their entirety.

BACKGROUND

1. Field

The disclosure relates to a ventilator, a cooking apparatus including the ventilator, and a ventilation system including the ventilator, and more particularly, to a ventilator having an oil mist filter and a cooking apparatus including the ventilator.

2. Description of Related Art

In a cooking process using a heating device, such as a gas range, an induction cooker, etc., polluted air containing a great quantity of oil mist can be generated.

Typically, such polluted air has been processed by inhaling air around the heating device through a hood. However, polluted air is still diffused to users.

Also, oil mist contained in the polluted air contaminates a blower installed inside the hood so that the blower breaks down or generates a bad smell.

SUMMARY

It is an aspect of the disclosure to provide a cooking apparatus including a ventilator having an oil mist filter, and a ventilation system including the ventilator.

It is another aspect of the disclosure to provide a cooking apparatus including a ventilator for preventing a blower from being contaminated by oil mist, and a ventilation system including the ventilator.

It is another aspect of the disclosure to provide a cooking apparatus including a ventilator for preventing oil mist from being diffused to a user, and a ventilation system including the ventilator.

Additional aspects of the disclosure will be set forth in part in the description which follows and, in part, will be obvious from the description, or may be learned by practice of the disclosure.

In accordance with an aspect of the disclosure, a cooking apparatus includes: a main body; and a ventilator comprising a ventilator body including an inlet configured to inhale air containing oil mist generated in a cooking process using a heating device; a blower configured to blow the inhaled air from the inlet; and an oil mist filter positioned inside the ventilator body and configured to remove the oil mist by filtering the oil mist from the inhaled air.

The oil mist filter may include a filtering member made of a metal material and configured to attach the filtered oil mist to a surface of the filtering member.

The oil mist filter may further include a cooling device configured to receive power to cool the filtering member and the oil mist is condensed to the filtering member.

The filtering member may include a plate, and the cooling device may include a Peltier device configured to cool the plate.

The oil mist filter may further include an ionizer configured to charge the oil mist, and the filtering member may include a plate that is charged and to which oil mist charged by the ionizer attaches.

The oil mist filter may further include a water tank positioned below the filtering member, and a water vapor generator configured to vaporize water stored in the water tank, wherein the vaporized water mixed with the oil mist may attach to the surface of the filtering member.

The filtering member may include a guide curved surface configured to guide water drops condensed on the surface to the water tank.

The oil mist filter may further include a water tank configured to store water into which at least a portion of the filtering member sinks, and a rotation device configured to rotate the filtering member, the filtering member may include a plurality of holes formed in a surface of the filtering member, and the filtering member is configured to rotate, by the rotating device, to expose water permeated into the plurality of holes to the oil mist.

A flow path may be formed inside the ventilator body, and the oil mist filter may be located on the flow path upstream from the blower.

The ventilator body may include: a housing positioned inside the main body; and an inhalation duct coupled with a side of the housing, wherein the inlet may be formed at a portion of the inhalation duct, exposed to an upper space of the main body.

The oil mist filter may be installed inside the housing.

The oil mist filter may be installed inside the inhalation duct.

The ventilator body may further include an exhaust duct coupled with another side of the housing, wherein the exhaust duct includes an outlet configured to discharge the air blown by the blower toward the inlet.

The inhalation duct may be positioned behind the heating device, and the exhaust duct may be positioned in front of the heating device.

The ventilator is configured to discharge air toward a rear direction of the heating device through the outlet to form an air curtain to prevent oil mist from diffusing to a user performing cooking in front of the heating device.

In accordance with an aspect of the disclosure, a cooking apparatus includes: a heating device including a heating portion; and a ventilator configured to inhale polluted air generated in a cooking process using the heating device, wherein the ventilator includes: an inlet and an outlet; a flow path connecting the inlet to the outlet; a blower positioned on the flow path and configured to form an air current; and an oil mist filter including a filtering member, wherein air blown by the blower and flowing along the flow path is in contact with the filtering member, and a Peltier device configured to cool the filtering member to condense the oil mist.

The blower and the oil mist filter may be positioned below the heating device.

The ventilator may be positioned above the heating device.

The outlet may discharge air toward the inlet to move the polluted air to the inlet.

In accordance with an aspect of the disclosure, an oil mist filter configured to filter oil mist generated during cooking includes: a plate which is made of a metal material and which air including oil mist is in contact with; and a Peltier device fixed to the plate and configured to cool the plate and condense the oil mist on a surface of the plate.

Definitions for certain words and phrases are provided throughout this patent document, those of ordinary skill in the art should understand that in many, if not most instances, such definitions apply to prior, as well as future uses of such defined words and phrases.

The oil mist filter according to an aspect of the disclosure may remove oil mist from air to be supplied to the blower of the ventilator, thereby preventing the blower from being contaminated by the oil mist.

The ventilator according to an aspect of the disclosure may discharge air from which oil mist has been removed through the outlet, thereby forming an air curtain preventing polluted air from being diffused toward a user.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 7 is a control block diagram of the ventilator shown in FIG. 5;

DETAILED DESCRIPTION

Figure 1:
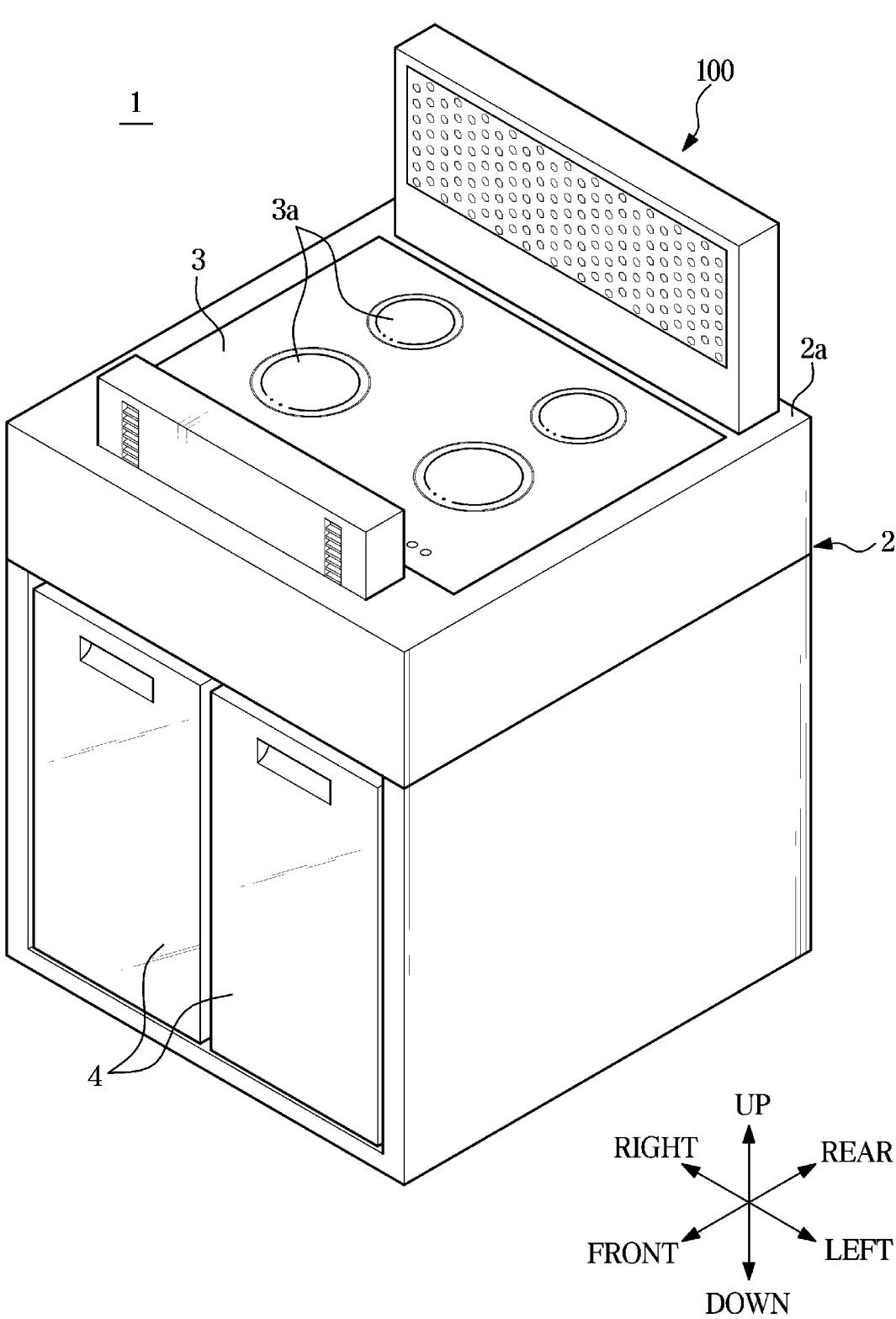
FIG. 1 shows a cooking apparatus according to an embodiment of the disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device:

Configurations illustrated in the embodiments and the drawings described in the present specification are only the preferred embodiments of the present disclosure, and thus it is to be understood that various modified examples, which may replace the embodiments and the drawings described in the present specification, are possible when filing the present application.

Also, like reference numerals or symbols denoted in the drawings of the present specification represent members or components that perform the substantially same functions.

Also, the terms used in the present specification are merely used to describe the embodiments, and are not intended to limit and/or restrict the disclosure. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, operations, components, members, or combinations thereof, but do not preclude the presence or addition of one or more other features, figures, steps, operations, components, members, or combinations thereof.

Also, it will be understood that, although the terms including ordinal numbers, such as "first", "second", etc., may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

Meanwhile, in the following description, the terms "front direction", "rear direction", "left", and "right" are defined based on the drawings, and the shapes and positions of the components are not limited by the terms.

Throughout the disclosure, the expression "at least one of a, b or c" indicates only a, only b, only c, both a and b, both a and c, both b and c, all of a, b, and c, or variations thereof.

Figure 2:
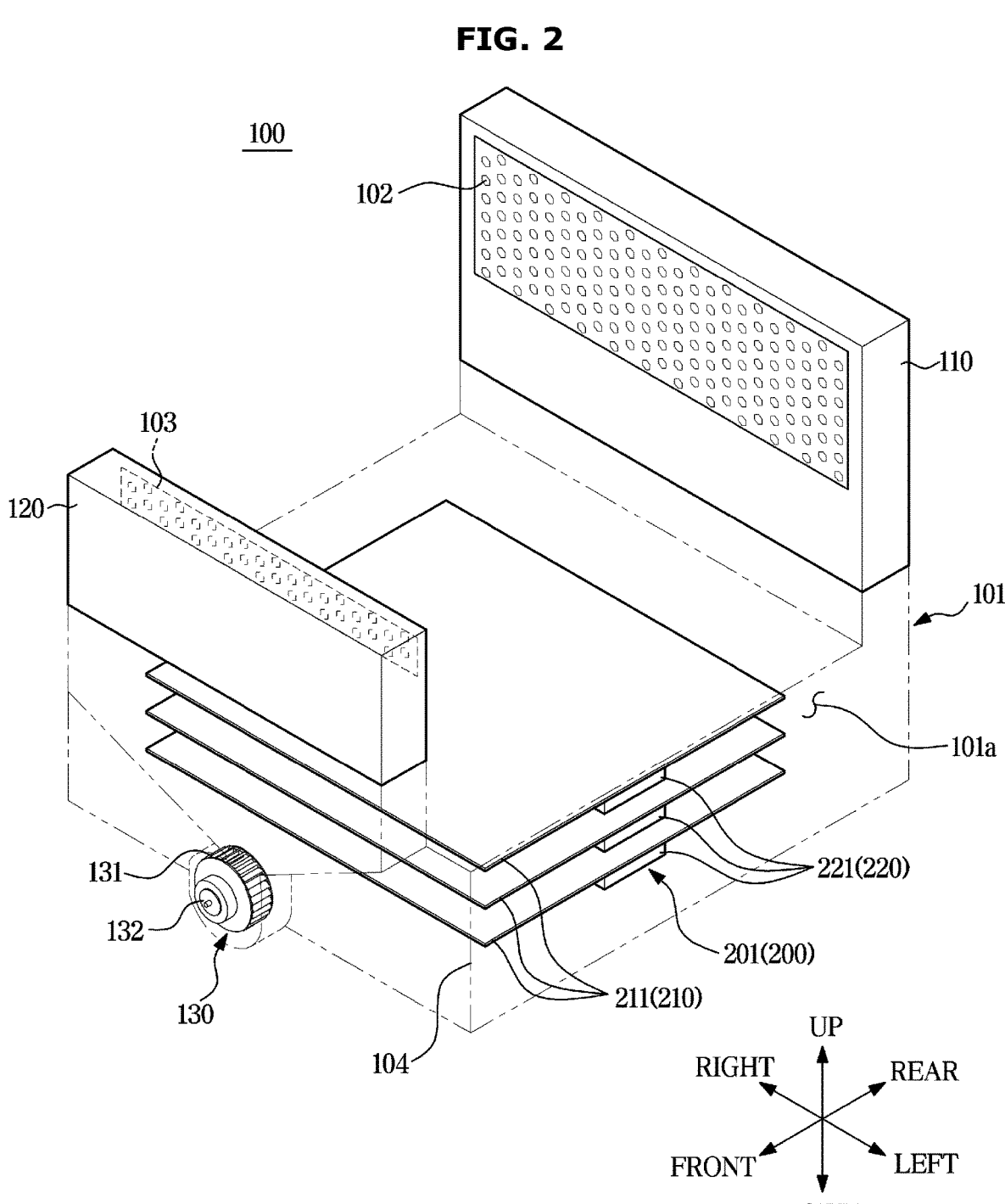
FIG. 2 shows a ventilator provided in the cooking apparatus shown in FIG. 1.
Figure 3:
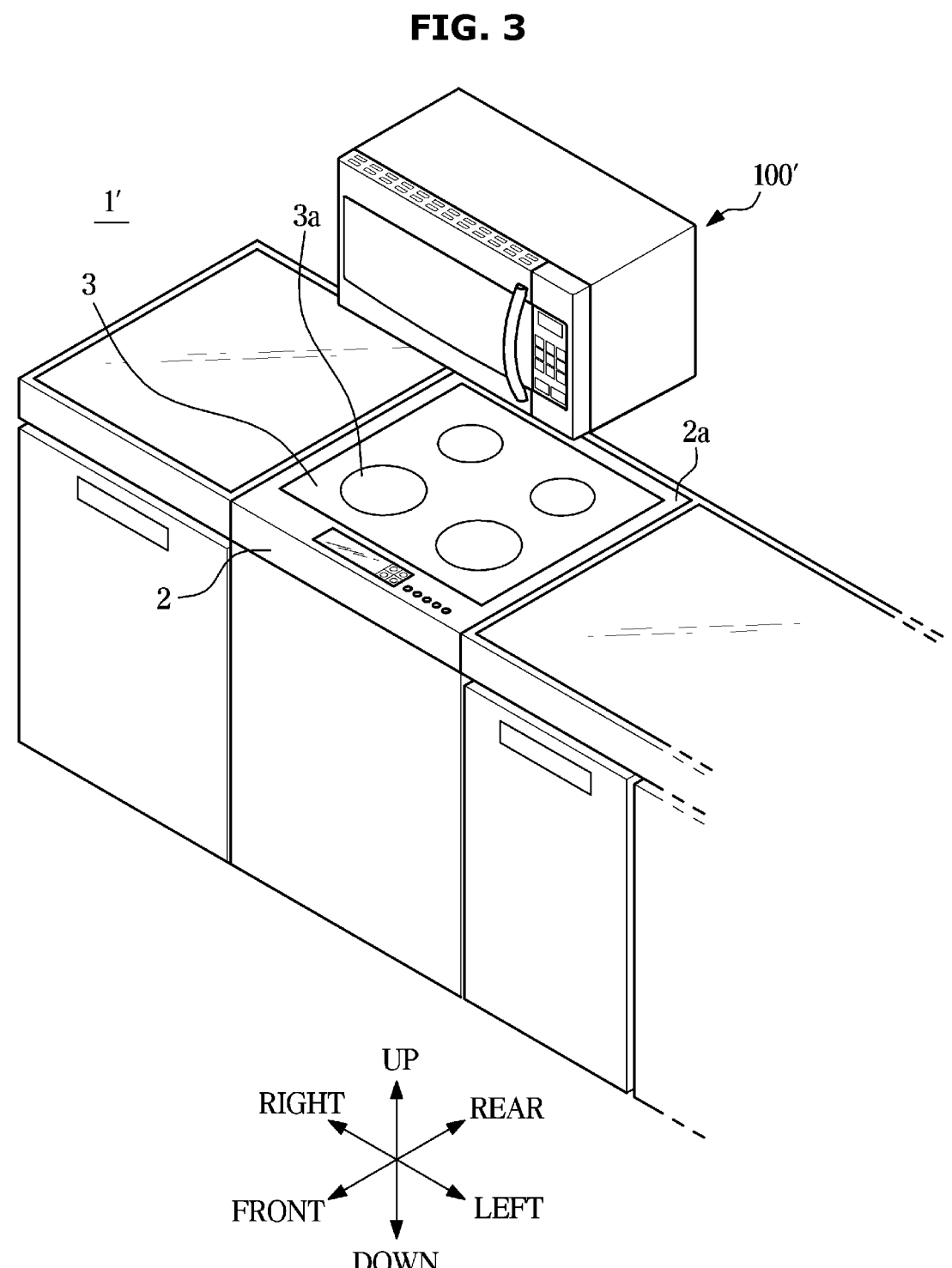
FIG. 3 shows a cooking apparatus according to another embodiment of the disclosure.
Figure 4:
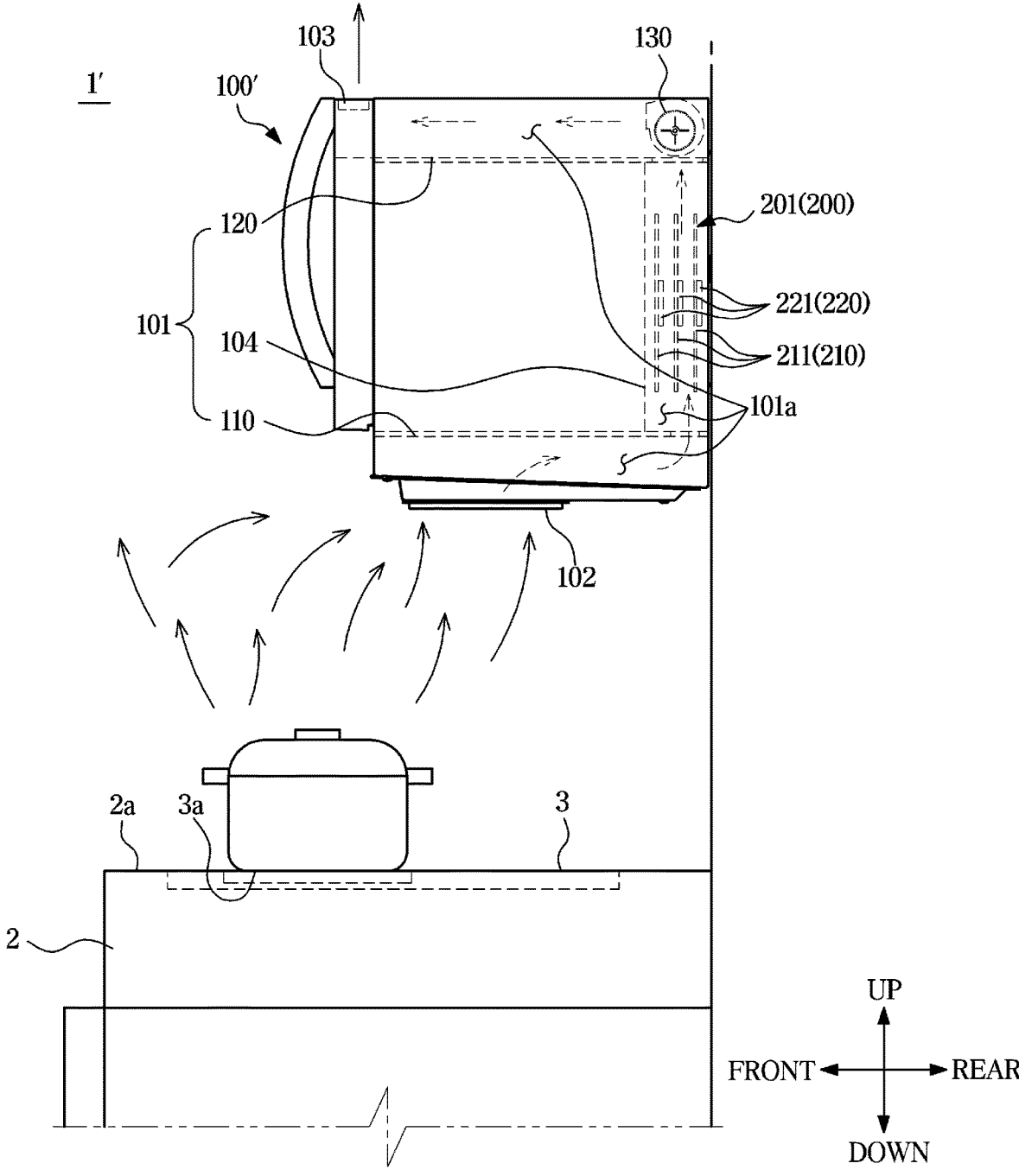
FIG. 4 is a side cross-sectional view of the cooking apparatus shown in FIG. 3.

FIG. 1 shows a cooking apparatus according to an embodiment of the disclosure. FIG. 2 shows a ventilator provided in the cooking apparatus shown in FIG. 1. FIG. 3 shows a cooking apparatus according to another embodiment of the disclosure. FIG. 4 is a side cross-sectional view of the cooking apparatus shown in FIG. 3.

Referring to FIGS. 1 to 4, a cooking apparatus 1 may include a main body 2, a heating device 3, and a ventilator 100 (or a "hood"). Hereinafter, a structure of the cooking apparatus 1 will be described. The following content may correspond to descriptions about the ventilator 100 provided independently, as well as the ventilator 100 provided in the cooking apparatus 1.

Meanwhile, hereinafter, a case in which the ventilator 100 inhales polluted air generated in a cooking process using the heating device 3 and/or discharges purified air will be described as an example. However, the disclosure is not limited to this, and the ventilator 100 may inhale air polluted by another pollution source, not by the heating device 3, and/or discharge purified air.

The main body 2 may form an outer appearance of the cooking apparatus 1. The main body 2 may stand on a kitchen floor. The main body 2 may be substantially in a shape of a box. The main body 2 may include a storage space formed thereinside and opening forward. In the main body 2, a storage closet door 4 which opens or closes the storage space and forms a front side of the main body 2 may be provided, although not limited thereto. However, for example, the storage closet door 4 may be omitted, and in the storage space, another cooking apparatus or heating device, such as an oven, a microwave, etc., may be positioned.

The main body 2 may extend in a left-right direction. A top surface 2a of the main body 2 may extend in the left-right direction. The heating device 3 may be positioned to a side of the top surface 2a of the main body 2, and the other side of the top surface 2a of the main body 2 may be used as a kitchen worktable.

The heating device 3 may be placed on the main body 2 to heat and cook food. The heating device 3 may include at least one heating portion 3a (or "burner") on which food or a container including food is put and heated. The heating portion 3a may be exposed to outside through a top surface of the heating device 3, and food or a container including food may be put on the heating portion 3a.

The heating device 3 may be installed on the top of the main body 2. The heating device 3 may form an outer appearance of the cooking apparatus 1. The heating device 3 may form the top surface 2a of the cooking apparatus 1 together with the top surface 2a of the main body 2.

The ventilator 100 may inhale polluted air generated during a cooking process using the heating device 3.

The ventilator 100 may purify polluted air inhaled into inside of the ventilator 100 and then discharge the purified air to the outside.

The ventilator 100 may include a ventilator body 101 forming a flow path 101a and forming an outer housing of the ventilator 100. The ventilator body 101 may include an inlet 102 for inhaling polluted air and an outlet 103 for discharging the air from the flow path 101a.

At least a portion of the ventilator body 101 may be positioned inside the main body 2. The ventilator body 101 may include a housing 104 positioned inside the main body 2, an inhalation duct 110 coupled with the housing 104 and including the inlet 102, and an exhaust duct 120 coupled with the housing 104 and including the outlet 103. The housing 104, the inhalation duct 110, and the exhaust duct 120 may form the flow path 101a together. An end of the flow path 101a may be connected to the inlet 102, and the other end of the flow path 101a may be connected to the outlet 103. At least two or more of the housing 104, the inhalation duct 110, and the exhaust duct 120 may be integrated into a single body.

The ventilator 100 may include a blower 130 for forming an air current inside the ventilator body 101. The blower 130 may be positioned on the flow path 101a. The blower 130 may be positioned inside the ventilator body 101 (for example, the housing 104). The blower 130 may blow air entered through the inlet 102 to the outlet 103. The blower 130 may include a blow fan 131. The blow fan 131 may include a cross-flow fan, a sirocco fan, a mixed flow fan, an axial fan, or a turbo fan, although not limited thereto. The blow fan 131 may include another kind of fan. The blower 130 may include a motor 132 for rotating the blow fan 131.

The blower 130 may be positioned on the flow path 101a downstream from an air purifier 200 which will be described below. The blower 130 may be closer to the outlet 103 than the inlet 102. The blower 130 may be adjacent to the exhaust duct 120, although not limited thereto. However, the blower 130 may be positioned on the flow path 101a upstream from the air purifier 200 to be closer to the inlet 102 than the outlet 103, although not limited thereto.

However, according to some embodiments of the disclosure, the blower 130 may include a plurality of blowers 130. The plurality of blowers 130 may include a first blower (or an "outlet blower") positioned on the flow path 101a downstream from the air purifier 200, and a second blower (or an "inlet blower") positioned on the flow path 101a upstream from the air purifier 200. In this case, the air purifier 200 may be positioned between the first blower and the second blower on the flow path 101a. The first blower may be positioned below the exhaust duct 120, and the second blower may be positioned below the inhalation duct 110. The first blower and the second blower may operate independently. The second blower may inhale polluted air into the inside of the ventilator body 101 through the inlet 102, and the first blower may discharge air purified by the air purifier 200 to the outside of the ventilator body 101 through the outlet 103.

The ventilator 100 may include the air purifier 200 for purifying (or "filtering") air entered the inside of the ventilator 100. For example, the air purifier 200 may include an oil mist filter 201 for filtering and removing oil mist in air, although not limited thereto. The air purifier 200 may include a filter member or a sterilizer. The air purifier 200 may be installed inside the ventilator body 101 (for example, the housing 104).

The air purifier 200 (for example, the oil mist filter 201) may be positioned on the flow path 101a upstream from the blower 130, and remove pollutants (for example, oil mist) from air to be supplied to the blower 130, although not limited thereto. The air purifier 200 may be positioned on the flow path 101a downstream from the blower 130, although not limited thereto.

A ventilator body 101 of a ventilator 100' of a cooking apparatus 1' may be positioned above the heating device 3. For example, the ventilator 100' may be a kitchen hood or a wall-mounted type microwave (or an "over the range"), and the ventilator body 101 forming the flow path 101a may be installed above the heating device 3. In this case, the inlet 102 may open downward in a bottom of the ventilator body 101 to correspond to the heating device 3, and the outlet 103 may be formed in another side (for example, a top side of the ventilator body 101) of the ventilator body 101 except for the bottom of the ventilator body 101. The flow path 101a may connect the inlet 102 to the outlet 103. The ventilator body 101 may include the housing 104 in which the air purifier 200 is installed, the inhalation duct 110 connected to the housing 104 and including the inlet 102, and the exhaust duct 120 connected to the housing 104 and including the outlet 103. At least two of the housing 104, the inhalation duct 110, and the exhaust duct 120 may be integrated into a single body.

The heating device 3 and the ventilator 100 may be integrated into a single body or manufactured as separate parts. Also, the heating device 3 and the ventilator 100 may be manufactured and sold separately.

Figure 5:
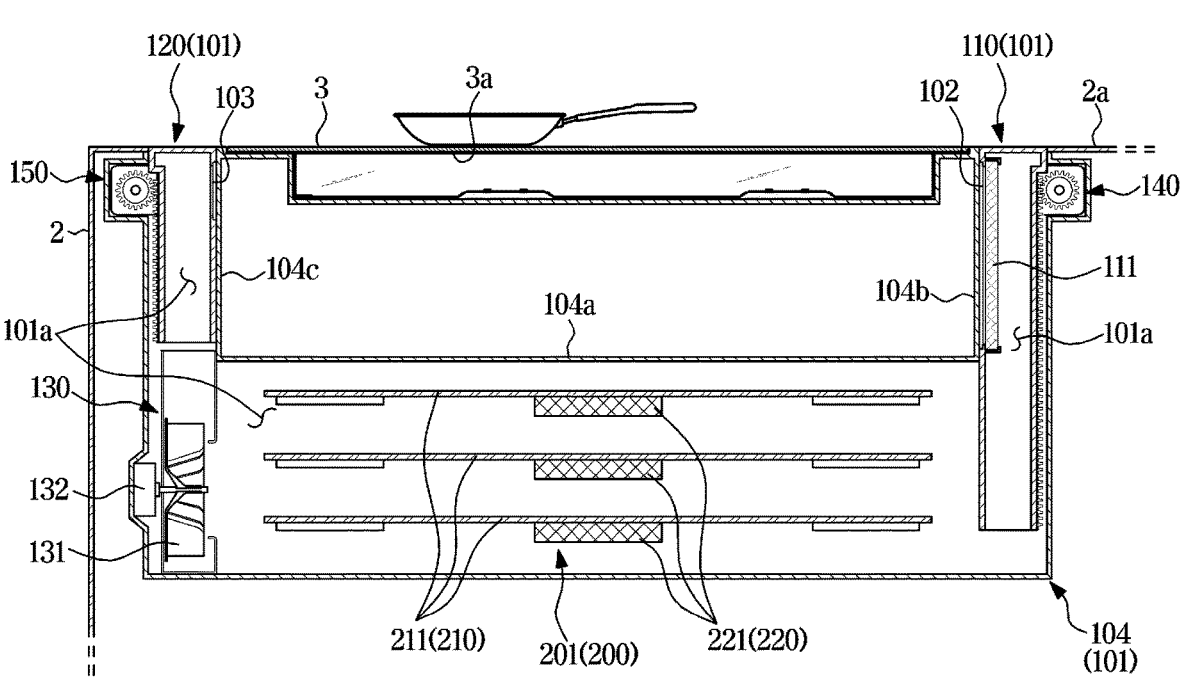
FIG. 5 is a side cross-sectional view showing a state in which a ventilator does not operate in the cooking apparatus shown in FIG. 2.
Figure 5:
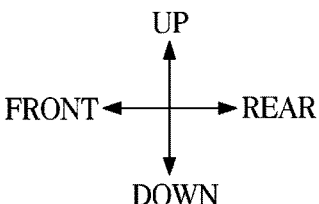
Figure 6:
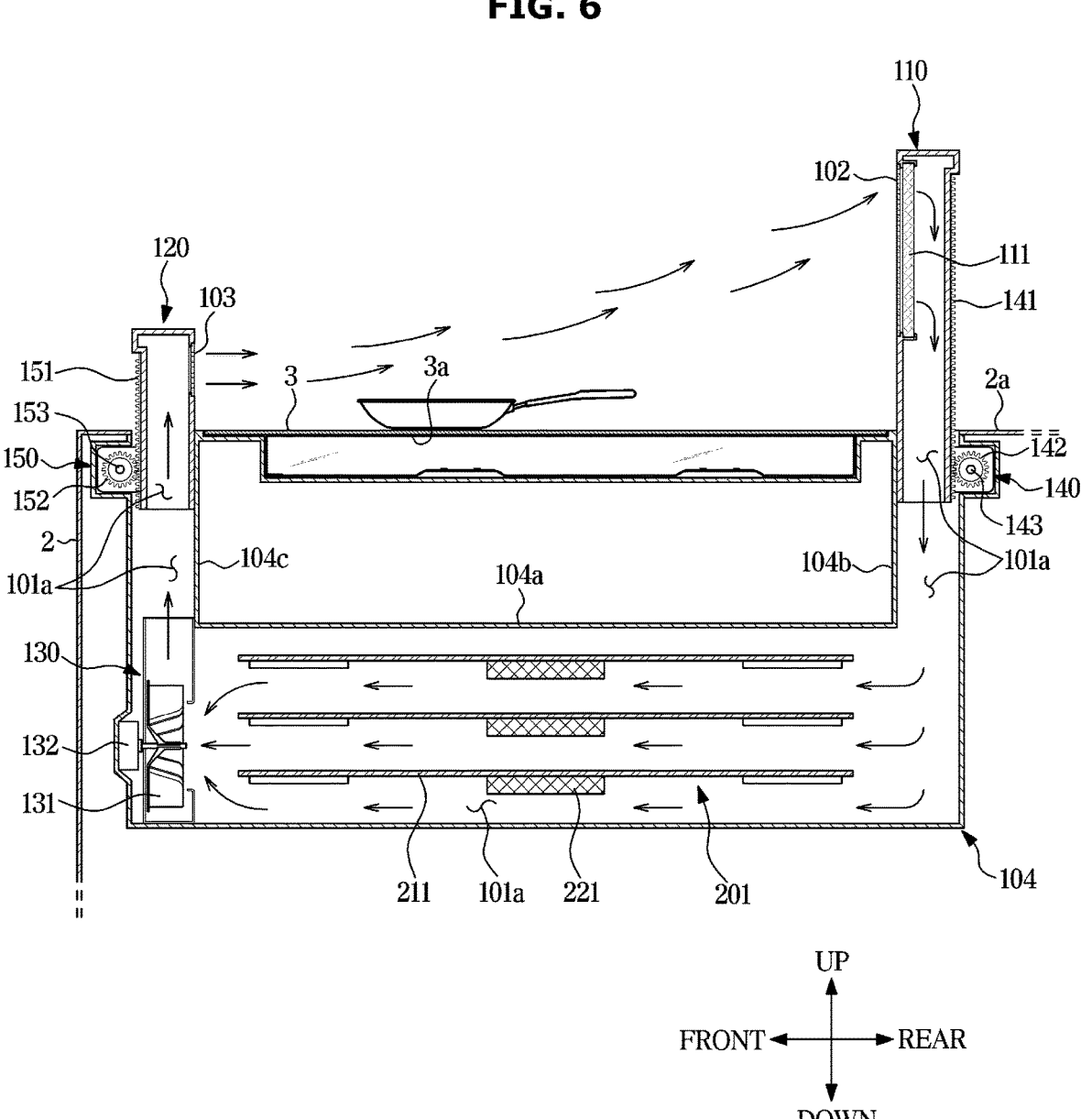
FIG. 6 is a side cross-sectional view showing a state in which a ventilator operates in the cooking apparatus shown in FIG. 2.
Figure 7:
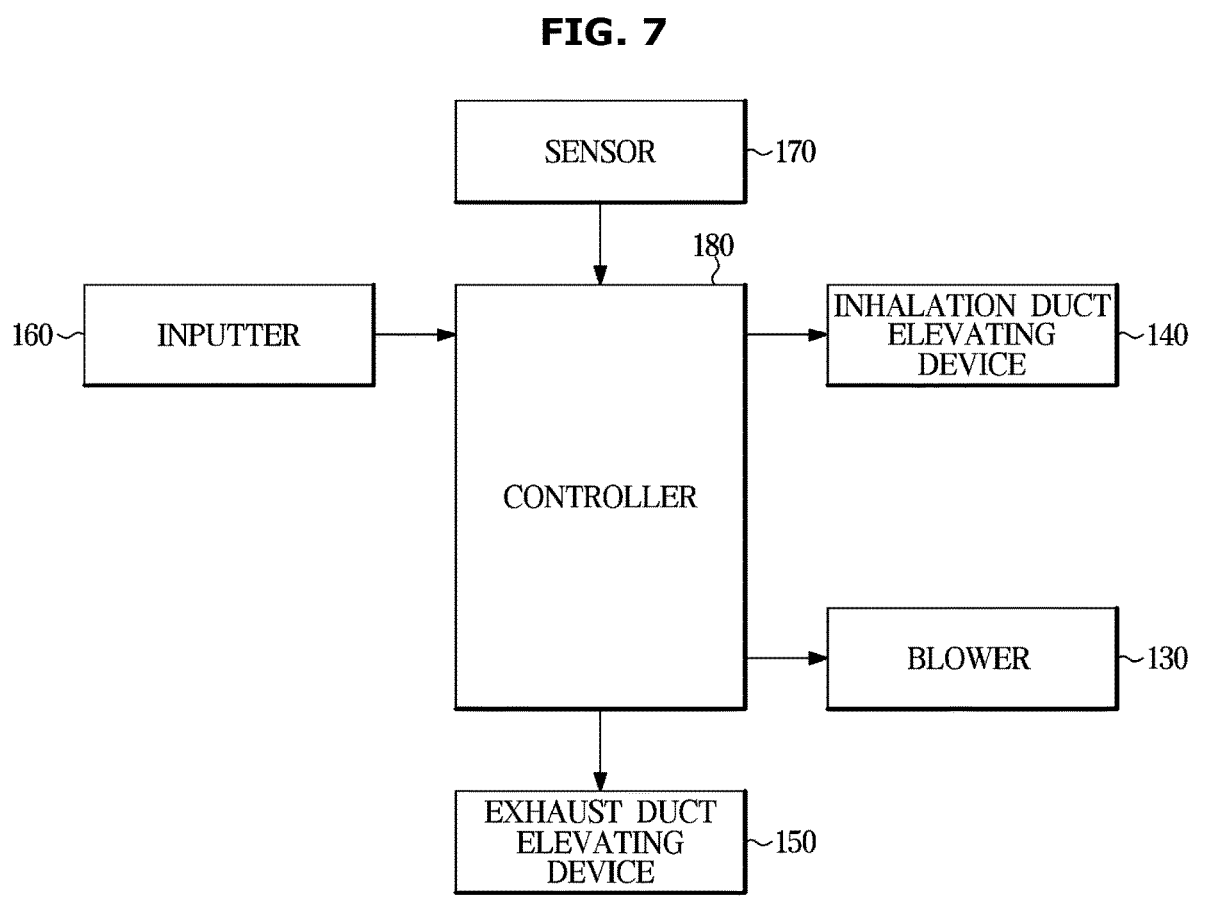

FIG. 5 is a side cross-sectional view showing a state in which the ventilator does not operate in the cooking apparatus shown in FIG. 2. FIG. 6 is a side cross-sectional view showing a state in which the ventilator operates in the cooking apparatus shown in FIG. 2. FIG. 7 is a control block diagram of the ventilator shown in FIG. 5.

Hereinafter, structures of the air purifier 200 and the ventilator 100 including the air purifier 200 will be described in detail. The ventilator 100 shown in FIGS. 1 and 2 will be described as an example. However, the disclosure is not limited to the ventilator 100. The following description may be also applied to the ventilator 100' shown in FIGS. 3 and 4.

Referring to FIGS. 5 to 7, the inhalation duct 110 may be positioned behind the heating device 3. At least a portion of the inhalation duct 110 may be exposed from the top surface 2a of the main body 2. The inlet 102 may be formed around a top of the inhalation duct 110 exposed from the top surface 2a of the main body 2. The inhalation duct 110 may include a filter 111 installed therein to filter air inhaled through the inlet 102. The filter 111 may include a mesh filter or a baffle filter, although not limited thereto. The filter 111 may include filters made of various materials and having various structures as long as the filters are usable to filter air. The filter 111 may cover the inlet 102.

The inhalation duct 110 may be movably coupled with the housing 104. The inhalation duct 110 may be slidably coupled with the housing 104. The inhalation duct 110 may be movable in an up-down direction.

More specifically, the ventilator 100 may include a first elevating device 140 (or an "inhalation duct elevating device") for moving the inhalation duct 110 in the up-down direction, and the inhalation duct 110 may rise up or fall down by the first elevating device 140. The first elevating device 140 may include a rack 141 fixed to the inhalation duct 110, a pinion 142 engaged with the rack 141, and a motor 143 for rotating the pinion 142, although not limited thereto.

The first elevating device 140 may include a scissors type lift coupled with a side (for example, a lower side or a upper side) of the inhalation duct 110 to move the inhalation duct 110 in the up-down direction, or a hydraulic cylinder coupled with a side (for example, the lower side or the upper side) of the inhalation duct 110 to move the inhalation duct 110 in the up-down direction. The first elevating device 140 may include various power sources or power transfer structures capable of moving the inhalation duct 110 in the up-down direction.

The exhaust duct 120 may be positioned in front of the heating device 3. At least a portion of the exhaust duct 120 may be exposed from the top surface 2a of the main body 2. The outlet 103 may be formed around a top of the exhaust duct 120 exposed from the top surface 2a of the main body 2. The exhaust duct 120 may be positioned above the blower 130.

The exhaust duct 120 may be movably coupled with the housing 104. The exhaust duct 120 may be slidably coupled with the housing 104. The exhaust duct 120 may be movable in the up-down direction. The exhaust duct 120 may move independently from the inhalation duct 110.

More specifically, the ventilator 100 may include a second elevating device 150 (or an "exhaust duct elevating device") for moving the exhaust duct 120 in the up-down direction, and the exhaust duct 120 may rise up or fall down by the second elevating device 150. The second elevating device 150 may include a rack 151 fixed to the exhaust duct 120, a pinion 152 engaged with the rack 151, and a motor 153 for rotating the pinion 152, although not limited thereto.

The second elevating device 150 may include a scissors type lift coupled with a side (for example, a lower side or a upper side) of the exhaust duct 120 to move the exhaust duct 120 in the up-down direction, or a hydraulic cylinder coupled with a side (for example, the lower side or the upper side) of the exhaust duct 120 to move the exhaust duct 120 in the up-down direction. The second elevating device 150 may include various power sources or power transfer structures capable of moving the exhaust duct 120 in the up-down direction. The second elevating device 150 may operate independently from the first elevating device 140.

The inlet 102 may move together with the inhalation duct 110. The outlet 103 may move together with the exhaust duct 120. A movement in a direction of the inhalation duct 110 and/or the exhaust duct 120 by the first elevating device 140 or the second elevating device 150 may hide the inlet 102 and/or the outlet 103 into the inside of the housing 104. The inhalation duct 110 and/or the exhaust duct 120 may move in the up-down direction by the first elevating device 140 and/or the second elevating device 150 to hide the inlet 102 and/or the outlet 103 below the top surface 2a of the main body 2.

More specifically, the housing 104 may include a purifier accommodating portion 104a in which the air purifier 200 is installed, an inhalation duct accommodating portion 104b that communicates with the purifier accommodating portion 104a and that the inhalation duct 110 is movably coupled with and accommodated in, and an exhaust duct accommodating portion 104c that communicates with the purifier accommodating portion 104a and that the exhaust duct 120 is movably coupled with and accommodated in. As the inhalation duct 110 moves in a direction (for example, downward) by the first elevating device 140 in a state in which the inlet 102 is exposed to the outside of the main body 2, a portion of the inhalation duct 110, which is accommodated in the inhalation duct accommodating portion 104b, may increase. As the inhalation duct 110 moves in a direction (for example, downward), the inlet 102 may be accommodated in the inhalation duct accommodating portion 104b and hidden not to be exposed to the outside of the housing 104. As the exhaust duct 120 moves in a direction (for example, downward) by the second elevating device 150, a portion of the exhaust duct 120, which is accommodated in the exhaust duct accommodating portion 104c, may increase. As the exhaust duct 120 moves in a direction (for example, downward), the outlet 103 may be accommodated in the exhaust duct accommodating portion 104c and hidden not to be exposed to the outside of the housing 104. At least two or more of the exhaust duct accommodating portion 104c, the inhalation duct accommodating portion 104b, and the purifier accommodating portion 104a may be integrated into a single body.

Meanwhile, by performing the above-described process in reverse in a state in which the inlet 102 is hidden, the inlet 102 may be exposed to an upper space of the main body 2. By performing the above-described process in reverse in a state in which the outlet 103 is hidden, the outlet 103 may be exposed to the upper space of the main body 2. The upper space of the main body 2 may be an outside space above the top surface 2a of the main body 2, and correspond to a space to which polluted air generated during a cooking process using the heating device 3 is diffused.

In a state in which the ventilator 100 does not operate, the inlet 102 and the outlet 103 may be hidden to not be exposed to the upper space of the main body 2, and according to an operation of the ventilator 100, the inlet 102 and/or the outlet 103 may be exposed to the upper space of the main body 2.

The ventilator 100 may include an inputter 160. The inputter 160 may be positioned on the top surface 2a of the main body 2 or the top surface of the heating device 3, although not limited thereto. The inputter 160 may be positioned on the top surface of the exhaust duct 120. A user may control the inputter 160 to select and control at least one or more of whether to move the inhalation duct 110, whether to move the exhaust duct 120, and whether to operate the blower 130.

The ventilator 100 may include a sensor 170. The sensor 170 may measure a height of food or a container put on the heating portion 3*a*. The sensor 170 may be positioned in the main body 2, the inhalation duct 110, the exhaust duct 120, or the heating device 3. For example, the sensor 170 may be positioned in the inhalation duct 110, and, as a result of exposure of the inlet 102 to the outside of the main body 2, the sensor 170 may be exposed to the upper space of the main body 2 together with the inlet 102 and measure a height of food or a container.

The ventilator 100 may include a controller 180. The controller 180 may be positioned in the main body 2, the housing 104, the inhalation duct 110, the exhaust duct 120, or the heating device 3. The controller 180 may receive a signal from the inputter 160 and/or the sensor 170, and control an operation of the blower 130, an operation of the first elevating device 140, and an operation of the second elevating device 150 based on the signal from the inputter 160 and/or the sensor 170. The controller 180 may control movements of the inhalation duct 110 and the exhaust duct 120 by controlling the first and second elevating devices 140 and 150.

The outlet 103 may discharge air toward the inlet 102. More specifically, polluted air inhaled through the inlet 102 may arrive at the air purifier 200 (for example, the oil mist filter 201) along the flow path 101*a*, pass through the air purifier 200, and then be purified by the air purifier 200. The air purified by the air purifier 200 may be supplied to the blower 130, and the air entered the blower 130 may be blown to the outlet 103. The air blown by the blower 130 may be discharged toward the inlet 102 through the outlet 103. Meanwhile, the inhalation duct 110 may be opposite to the exhaust duct 120.

As such, the outlet 103 may discharge air toward the inlet 102 to move, to the inlet 102, polluted air existing in front of the heating device 3, which is distant from the inlet 102 and which a suction force by the blower 130 does not reach, thereby increasing a ventilation effect of the ventilator 100.

Also, because the outlet 103 of the ventilator 100 is located between the heating device 3 and a user performing cooking in front of the heating device 3, air discharged from the outlet 103 to behind the heating device 3 may form an air curtain capable of preventing polluted air including oil mist from diffusing to the user.

The ventilator 100 may include the flow path 101*a* that guides air entered through the inlet 102 to the outlet 103. The flow path 101*a* may be formed by the inhalation duct 110, the exhaust duct 120, and the housing 104. The flow path 101*a* may be spaced away from the heating device 3, and the housing 104 may be spaced away from the heating device 3, although not limited thereto.

Figure 8:
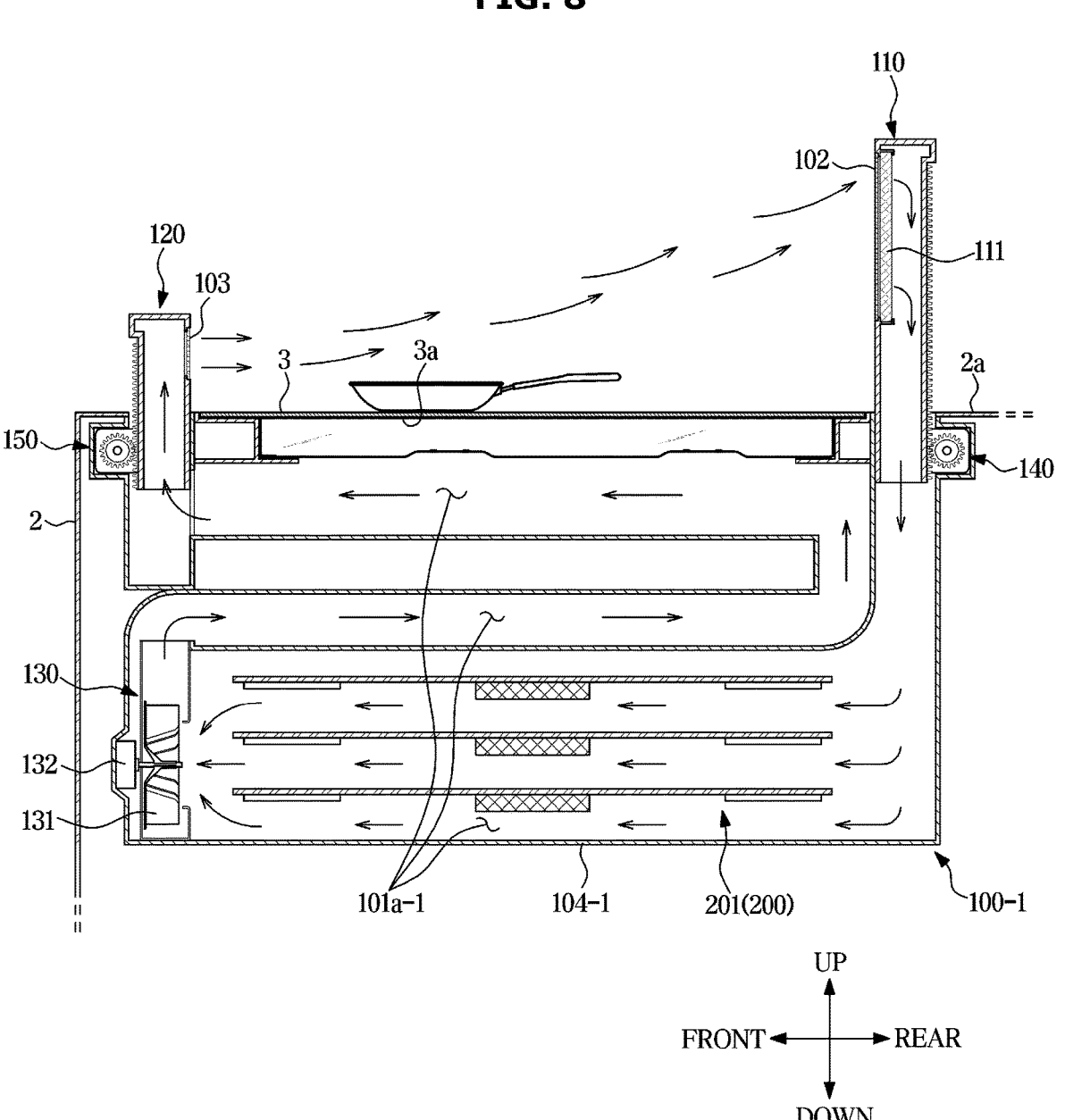
FIG. 8 shows a ventilator according to another embodiment of the disclosure in the cooking apparatus shown in FIG. 1.

FIG. 8 shows a ventilator according to another embodiment of the disclosure in the cooking apparatus shown in FIG. 1. The above descriptions about the ventilator 100 shown in FIGS. 5 and 6 may be also applied to a ventilator 100-1 shown in FIG. 8 unless the context clearly dictates otherwise.

Referring to FIG. 8, a flow path 101*a*-1 of the ventilator 100-1 may be connected to (or communicate with) the heating device 3, and supply air blown by the blower 130 to the heating device 3. The heating device 3 may be positioned on the flow path 101*a*-1 of the ventilator 100-1.

More specifically, the housing 104-1 may be coupled with the heating device 3 in such a way as to communicate with the heating device 3, and air discharged from the blower 130 may be guided to the heating device 3 by the flow path 101*a*-1 formed by the housing 104-1 to cool the heating device 3. In other words, the heating device 3 may be positioned on the flow path 101*a*-1 of the ventilator 100-1, and the heating device 3 may be positioned on the flow path 101*a*-1 downstream from the blower 130 and on the flow path 101*a*-1 upstream from the outlet 103. Air discharged from the blower 130 may cool the heating device 3, pass through the heating device 3, then be guided to the outlet 103, and be discharged.

Meanwhile, the blower 130 may be installed inside the housing 104-1, although not limited thereto. The blower 130 including the blow fan 131 may be installed inside the heating device 3 positioned on the flow path 101*a*-1. In this case, the blow fan 131 is also called a cooling fan of the heating device 3, and the blower 130 and the blow fan 131 may be considered as some components of the heating device 3. That is, the cooling fan 131 of the heating device 3 may form an air current in the flow path 101*a*-1 of the ventilator 100-1.

Figure 9:
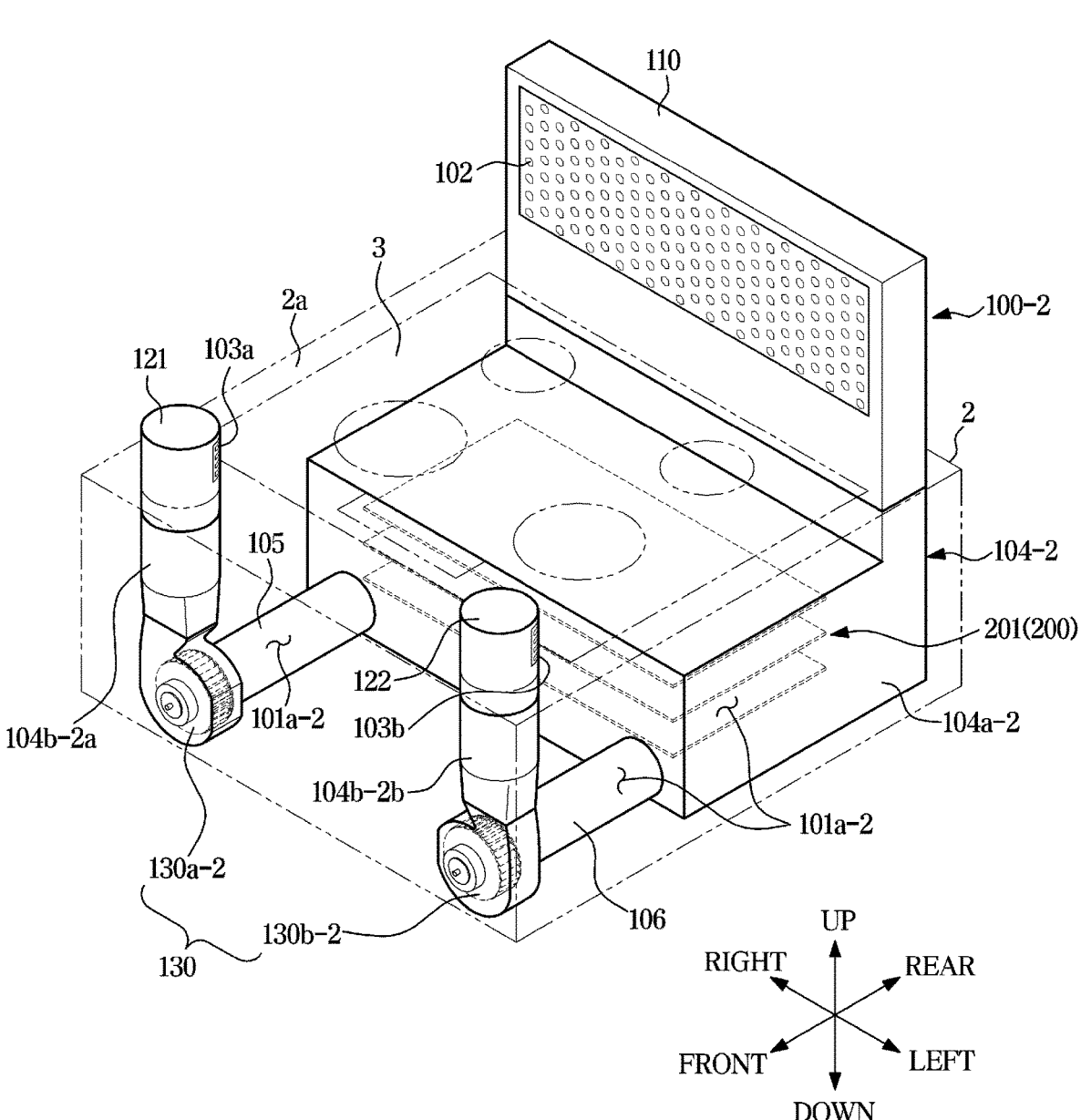
FIG. 9 shows a ventilator according to another embodiment of the disclosure in the cooking apparatus shown in FIG. 1.
Figure 10:
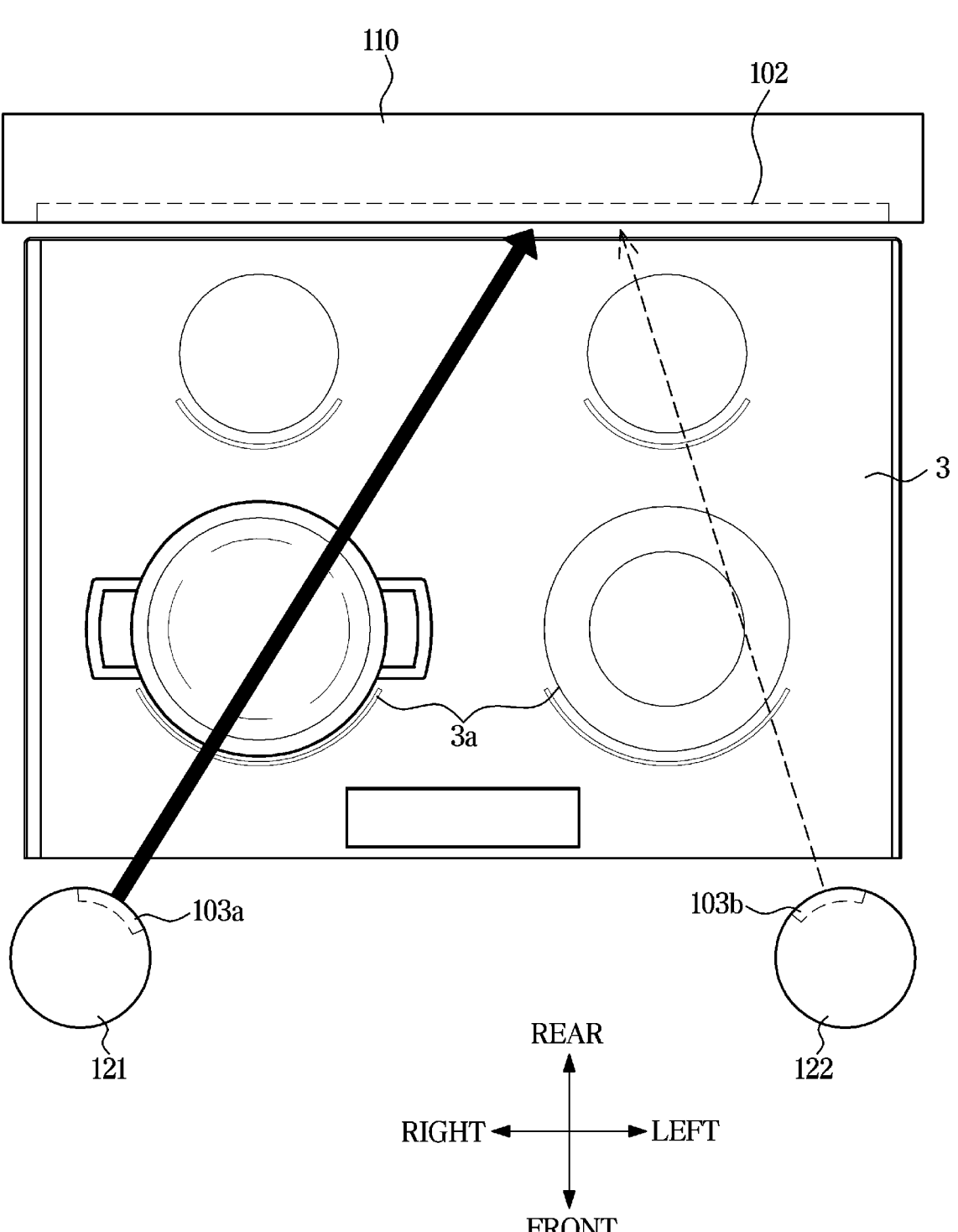
FIG. 10 is a schematic top view of the cooking apparatus shown in FIG. 9.

FIG. 9 shows a ventilator according to another embodiment of the disclosure in the cooking apparatus shown in FIG. 1. FIG. 10 is a schematic top view of the cooking apparatus shown in FIG. 9. The above descriptions about the ventilator 100 shown in FIGS. 5 and 6 may be also applied to the ventilator shown in FIGS. 9 and 10 unless the context clearly dictates otherwise.

Referring to FIGS. 9 and 10, exhaust ducts 121 and 122 of a ventilator 100-2 may include a plurality of exhaust ducts 121 and 122. Each of the exhaust ducts 121 and 122 may be rotatable on a rotation shaft extending in a direction (for example, the up-down direction). Each of the plurality of exhaust ducts 121 and 122 may be coupled with a housing 104-2 in such a way as to be rotatable on the rotation shaft extending in the up-down direction.

The plurality of exhaust ducts 121 and 122 may include a first exhaust duct 121 and a second exhaust duct 122. An outlet formed in the first exhaust duct 121 is also referred to as a first outlet 103*a*, and an outlet formed in the second exhaust duct 122 is also referred to as a second outlet 103*b*. The inhalation duct 110 shown in FIG. 9 may include a single inhalation duct 110, although not limited thereto. The inhalation duct 110 may include a plurality of inhalation ducts (for example, first and second inhalation ducts) corresponding to the plurality of exhaust ducts 121 and 122.

The housing 104-2 may be connected to a purifier accommodating portion 104*a*-2, and include a first diverging portion 105 and a second diverging portion 106 to guide air to the first and second exhaust ducts 121 and 122. The first diverging portion 105 may correspond to the first exhaust duct 121, and the second diverging portion 106 may correspond to the second exhaust duct 122.

Exhaust duct accommodating portions 104*b*-2*a* and 104*b*-2*b* of the housing 104-2 may include a first exhaust duct accommodating portion 104*b*-2*a* connected to the first diverging portion 105 and coupled with the first exhaust duct 121, and a second exhaust duct accommodating portion 104*b*-2*b* connected to the second diverging portion 106 and coupled with the second exhaust duct 122.

The blower 130 (or an "outlet blower") may include a third blower 130*a*-2 for discharging air toward the first exhaust duct 121, and a fourth blower 130*b*-2 for discharging air toward the second exhaust duct 122. The third blower 130*a*-2 may communicate with the first diverging portion 105. The third blower 130*a*-2 may be installed inside the first diverging portion 105. The fourth blower 130*b*-2 may communicate with the second diverging portion 106. The fourth blower 130*b*-2 may be installed inside the second diverging portion 106.

The first diverging portion 105 and the first exhaust duct accommodating portion 104b-2a may be integrated into a single body. The second diverging portion 106 and the second exhaust duct accommodating portion 104b-2b may be integrated into a single body.

The third blower 130a-2 may operate independently from the fourth blower 130b-2. The third blower 130a-2 and the fourth blower 130b-2 may be controlled by the controller 180. According to an operation of the third blower 130a-2, the first outlet 103a formed in the first exhaust duct 121 may discharge air, and according to an operation of the fourth blower 130b-2, the second outlet 103b formed in the second exhaust duct 122 may discharge air. A blow fan of the third blower 130a-2 and a blow fan of the fourth blower 130b-2 may rotate at the same or different revolutions per minute (rpm), and the third blower 130a-2 and the fourth blower 130b-2 may supply the same or different quantities of air to the first and second exhaust ducts 121 and 122. Accordingly, the first outlet 103a and the second outlet 103b may discharge the same or different quantities of air, although not limited thereto.

However, for example, the ventilator 100-2 may include a flow distribution apparatus positioned inside the housing 104-2. The first exhaust duct 121 and the second exhaust duct 122 may be coupled with a side of the housing 104-2. The flow distribution apparatus may be positioned on the flow path 101a-2 downstream from the blower 130, and on the flow path 101a-2 upstream from the first and second exhaust ducts 121 and 122. Air discharged from the blower 130 may be distributed to the first exhaust duct 121 and the second exhaust duct 122 by the flow distributing apparatus.

Each of the first exhaust duct 121 and the second exhaust duct 122 may rotate in the left-right direction with respect to the rotation shaft extending in the up-down direction. As the first exhaust duct 121 and the second exhaust duct 122 rotate in the left-right direction, discharge directions of the first outlet 103a and the second outlet 103b may be adjusted. The first exhaust duct 121 and the second exhaust duct 122 may rotate manually, or may rotate automatically by a rotating device. The rotating device may include a first rotating device for rotating the first exhaust duct 121 and a second rotating device for rotating the second exhaust duct 122. The rotating device may include a motor and a plurality of gears, although not limited thereto. The rotating device may be any device capable of rotating the first exhaust duct 121 and the second exhaust duct 122 separately by using power.

An elevating device (or "exhaust duct elevating device") may include a third elevating device for moving the first exhaust duct 121 in the up-down direction, and a fourth elevating device for moving the second exhaust duct 122 in the up-down direction.

The first exhaust duct 121 may move in the up-down direction by the third elevating device, and rotate in the left-right direction by the first rotating device. The second exhaust duct 122 may move in the up-down direction by the fourth elevating device, and rotate in the left-right direction by the second rotating device.

For example, the first and second rotating devices (for example, motors) may be fixed to the third and fourth elevating devices (for example, scissors type lifts or hydraulic cylinders), and the first and second rotating devices may be coupled with the first and second exhaust ducts 121 and 122. The first and second rotating devices and the first and second exhaust ducts 121 and 122 may move together in the up-down direction by the third and fourth elevating devices, and in a state in which the first and second outlets 103a and 103b are exposed to the upper space of the main body 2, the first and second rotating devices may rotate the first and second exhaust ducts 121 and 122. The first and second elevating devices and the first and second rotating devices may be controlled by the controller 180, although not limited thereto.

However, the first and second elevating devices may be omitted. At least one portions of the first and second exhaust ducts 121 and 122 may protrude or be exposed to the top surface 2a of the main body 2 such that the first and second outlets 103a and 103b are exposed to the upper space of the main body 2. The first and second exhaust ducts 121 and 122 may be rotatably coupled with the housing 104-2. The first and second exhaust ducts 121 and 122 may rotate manually, or may rotate automatically by a rotating device.

The first exhaust duct 121 and the second exhaust duct 122 may be respectively positioned at a left front side and a right front side of the heating device 3. The first exhaust duct 121 may be symmetrical to the second exhaust duct 122 with respect to a center in left-right direction of the heating device 3.

According to rotations of the first exhaust duct 121 and the second exhaust duct 122, the directions of the first outlet 103a and the second outlet 103b may be adjusted to discharge air toward the heating portion 3a corresponding to the first and second outlets 103a and 103b or toward the heating portion 3a designated according to a user's selection. As such, the user may adjust the directions of the first and second outlets 103a and 103b such that the first and second outlets 103a and 103b face the heating portion 3a discharging a great quantity of polluted air, or such that the first or second outlet 103a or 103b facing the heating portion 3a discharging a great quantity of polluted air discharges a greater quantity of air than the remaining one. Therefore, ventilation by the ventilator 100-2 may be more efficiently performed.

Figure 11:
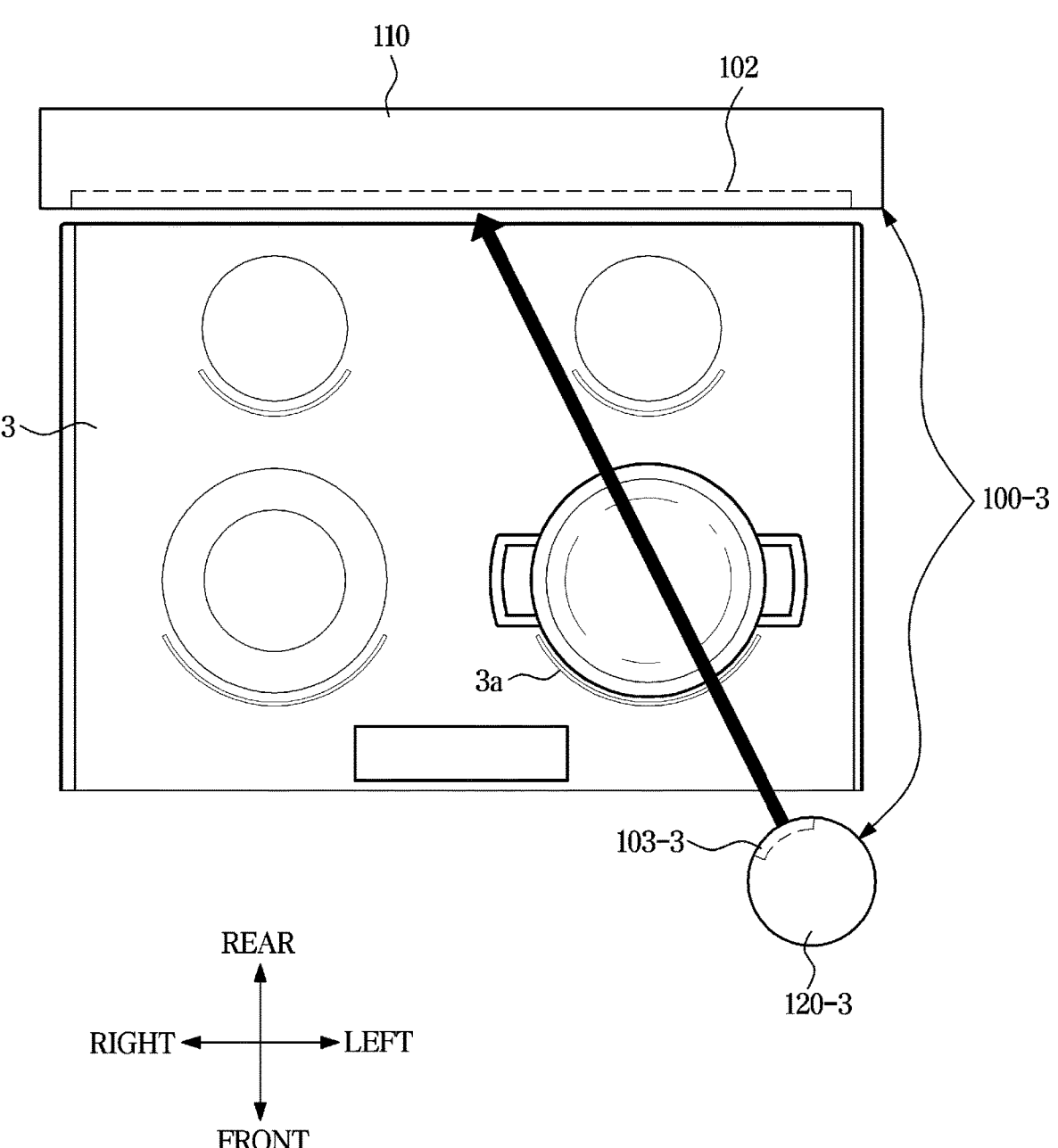
FIG. 11 schematically shows a ventilator according to another embodiment of the disclosure in the cooking apparatus shown in FIG. 1.

However, the disclosure is not limited to this. FIG. 11 schematically shows a ventilator according to another embodiment of the disclosure in the cooking apparatus shown in FIG. 1. The above descriptions about the ventilator shown in FIG. 5 and/or FIG. 9 may be also applied to the ventilator shown in FIG. 11 unless the context clearly dictates otherwise.

Referring to FIG. 11, an exhaust duct 120-3 of a ventilator 100-3 may be movable in the up-down direction. The exhaust duct 120-3 may be rotatable in the left-right direction on a rotation shaft extending in the up-down direction.

The exhaust duct 120-3 may be a single exhaust duct 120-3, and may be located to a side (for example, a right side) with respect to a center in left-right direction of the heating device 3 as seen from above. An outlet 103-3 of the exhaust duct 120-3 may correspond to some of a plurality of heating portions 3a, and move polluted air generated by the corresponding heating portion 3a to the inlet 102. The heating portion 3a corresponding to the outlet 103-3 of the exhaust duct 120-3 may have been set in advance, or may be set by a user's selection.

The ventilator 100-3 may form an air curtain to prevent oil mist generated by the heating portion 3a corresponding to the exhaust duct 120-3 from diffusing. That is, the air curtain may cover some of the plurality of heating portions 3a. Thereby, a volume and consumption power of the ventilator 100-3 may be reduced.

So far, structures of a ventilator and a cooking apparatus including the ventilator have been described. Hereinafter, structures of oil mist filters according to various embodiments of the disclosure will be described in detail.

The ventilators 100, 100', 100-1, 100-2, and 100-3 shown in FIGS. 1 to 11 may include an oil mist filter 201 which is a kind of the air purifier 200. Hereinafter, for convenience of description, the ventilator 100 shown in FIG. 2 will be described as an example. However, the disclosure is not limited to this. The following descriptions may be also applied to the oil mist filter 201 provided in the ventilators 100', 100-1, 100-2, and 100-3 shown in FIGS. 3, 4, 8, 9, and 11.

The oil mist filter 201 may filter and remove oil mist from air supplied to the outlet 103 such that air from which oil mist has been removed is discharged from the outlet 103. The oil mist filter 201 may filter and remove oil mist from air supplied to the blower 130 to prevent exposing the blower 130 to oil mist and avoiding contamination or operating incorrectly. Air flowing along the flow path 101*a* may pass through the oil mist filter 201, and the oil mist filter 201 may remove oil mist from the air flowing along the flow path 101*a*.

The oil mist filter 201 may be positioned on the flow path 101*a* of the ventilator 100. The oil mist filter 201 may be installed inside the housing 104. More specifically, the oil mist filter 201 may be installed in the purifier accommodating portion 104*a* of the housing 104, although not limited thereto. At least one portion of the oil mist filter 201 may be installed inside the exhaust duct 120 and/or inside the inhalation duct 110.

The oil mist filter 201 may include a plurality of oil mist filters 201. For example, the oil mist filter 201 may include a first oil mist filter installed in the purifier accommodating portion 104*a*, and a second oil mist filter of which at least one portion is installed inside the inhalation duct 110.

The oil mist filter 201 may include a filtering member 210 to which oil mist separated from air attaches. More specifically, oil mist may attach in the form of fine oil drops to the filtering member 210, or may be mixed with water vapor and attach in the form of fine drops of mixtures of water and oil to the filtering member 210.

The filtering member 210 may be provided to filter the oil mist. Specifically, the filtering member 210 may physically filter the oil mist so that the oil mist is separated from the air. For example, the filtering member 210 may be formed of a mesh filter and provided to filter oil mist.

In this case, the power may not be supplied to the filtering member 210, and the power may be supplied only to the blower 130.

The filtering member 210 may be in contact with air flowing along the inside of the ventilator body 101. The filtering member 210 may be positioned on the flow path 101*a*.

The filtering member 210 may be made of a heat conductive material. The filtering member 210 may be made of a metal material (for example, aluminum, copper, stainless, etc.), although not limited thereto. However, the filtering member 210 may be made of plastic, glass, etc.

The oil mist filter 201 may include a plurality of filtering members 210. The filtering member 210 may include a plurality of filtering members 210. For example, the plurality of filtering members 210 of the oil mist filter 201 installed inside the housing 104 (for example, the purifier accommodating portion 104*a*) may be installed inside the housing 104 (for example, the purifier accommodating portion 104*a*) in such a way as to be separated from each other.

The filtering member 210 may include a plate 211. The plate 211 may be substantially in a shape of a quadrangular flat plate. The plate 211 may be positioned in parallel to a direction of an air current flowing along the flow path 101*a*.

More specifically, the plate 211 may be positioned vertically or horizontally inside the housing 104 in such a way as to be parallel to a direction of an air current flowing along the inside of the housing 104 (for example, the purifier accommodating portion 104*a*), although not limited thereto. The filtering member 210 may include a general heat sink including a plurality of fins, a refrigerant pipe, etc.

The oil mist filter 201 may include a cooling device 220 for cooling the filtering member 210 (for example, the plate 211). The cooling device 220 may be coupled with the filtering member 210 (for example, the plate 211). The cooling device 220 may receive power from an external power source (or "power supply unit") to cool the filtering member 210. More specifically, the cooling device 220 may include a Peltier device 221 (or a "thermoelectric device") fixed on a side of the plate 211 to cool the plate 211. The cooking apparatus 1 may include a power supply (or a "power supply portion"), and the Peltier device 221 may receive power from an external power supply (or a "power supply portion") of the ventilator body 101 and cool the plate 211 by the Peltier effect, although not limited thereto.

However, for example, the cooling device 220 may include a refrigerant circulating device including a refrigerant (for example, water) and circulating the refrigerant, and the cooling device 220 may supply the refrigerant to the filtering member (for example, a refrigerant pipe) 210 to cool the filtering member 210. That is, the filtering member (for example, a refrigerant pipe) 210 may be cooled by a refrigerant (for example, water).

As a result of cooling of the filtering member 210, oil mist may be condensed on a surface of the filtering member 210 and attach in a form of oil drops to the filtering member 210. Accordingly, oil mist may be removed from polluted air.

The filtering member 210 may be detachably coupled to the housing 104, and the filtering member 210 may be washable to remove oil mist collected thereon, although not limited thereto. For example, oil drops attached to the surface of the filtering member 210 may fall down by gravity, and thereby, oil mist collected on the filtering member 210 may be removed and thus collected on a bottom of the housing 104 (for example, the purifier accommodating portion 104*a*). As another example, oil drops attached on the surface of the filtering member 210 may fall down by gravity, a water tank containing water or an empty tray may be provided below the filtering member 210, and oil drops separated from the filtering member 210 may be collected in the water tank or the tray for easy cleaning.

Figure 12:
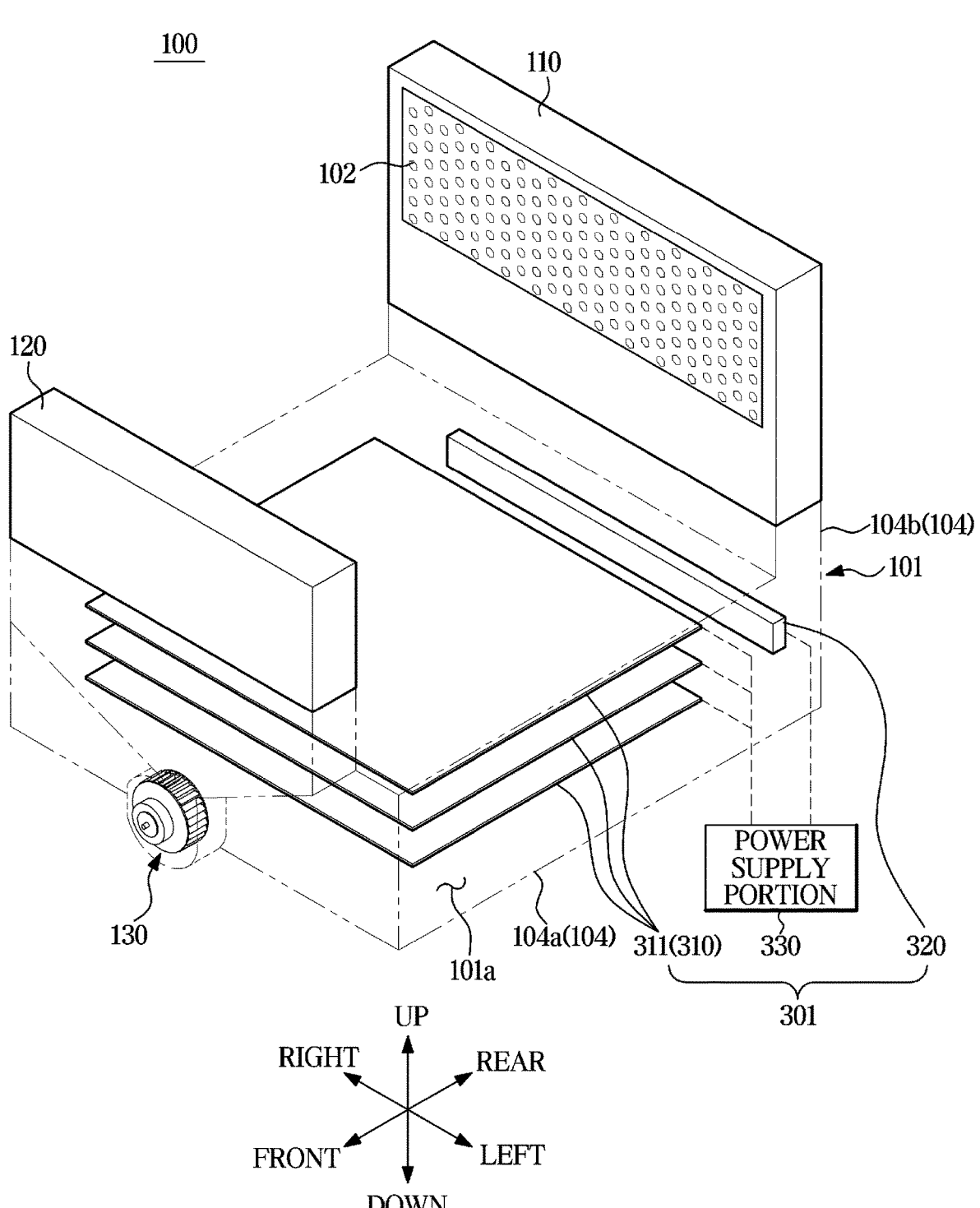
FIGS. 12 to 14 show oil mist filters according to various embodiments of the disclosure in ventilators according to various embodiments of the disclosure.
Figure 13:
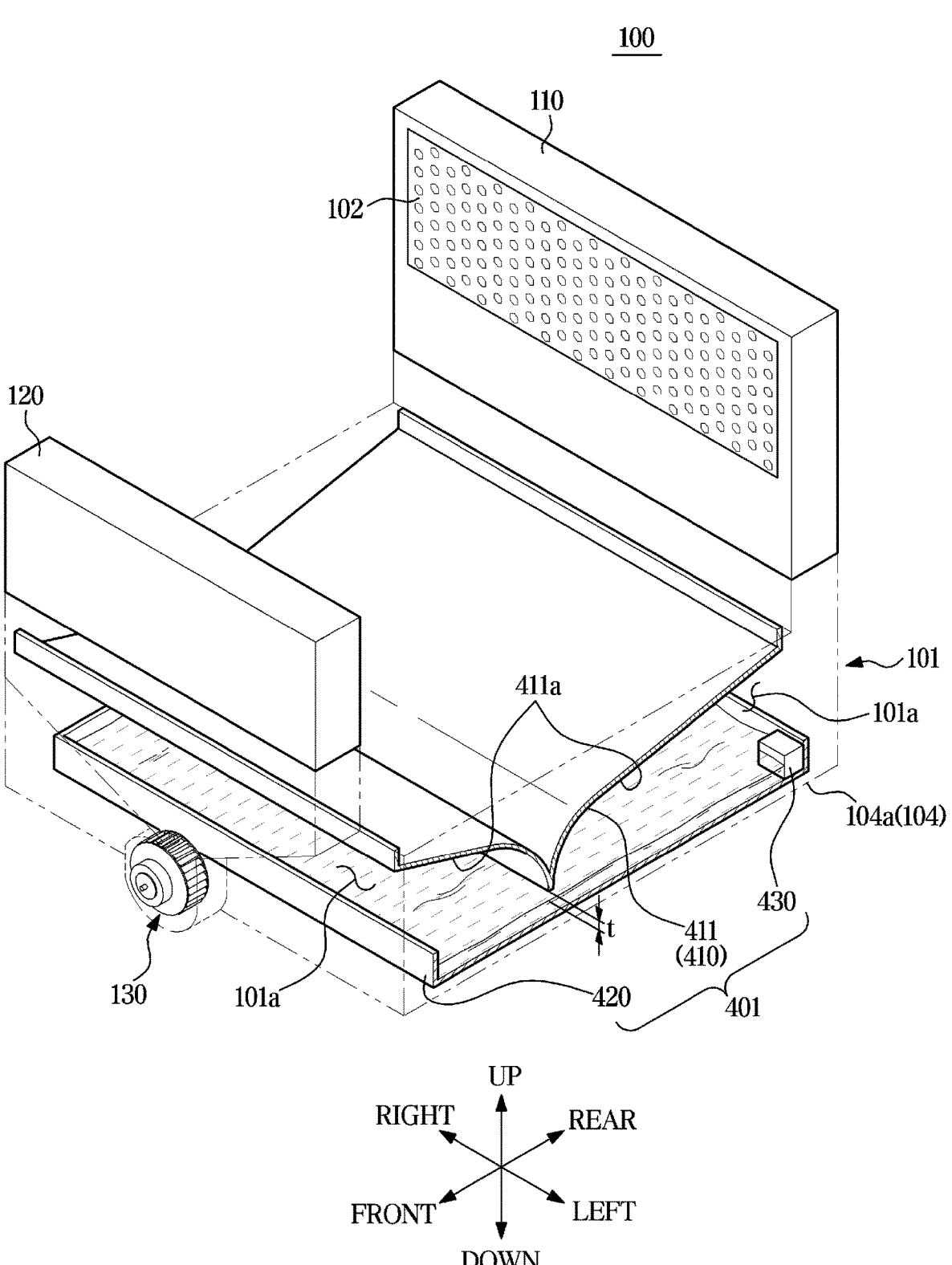
Figure 14:
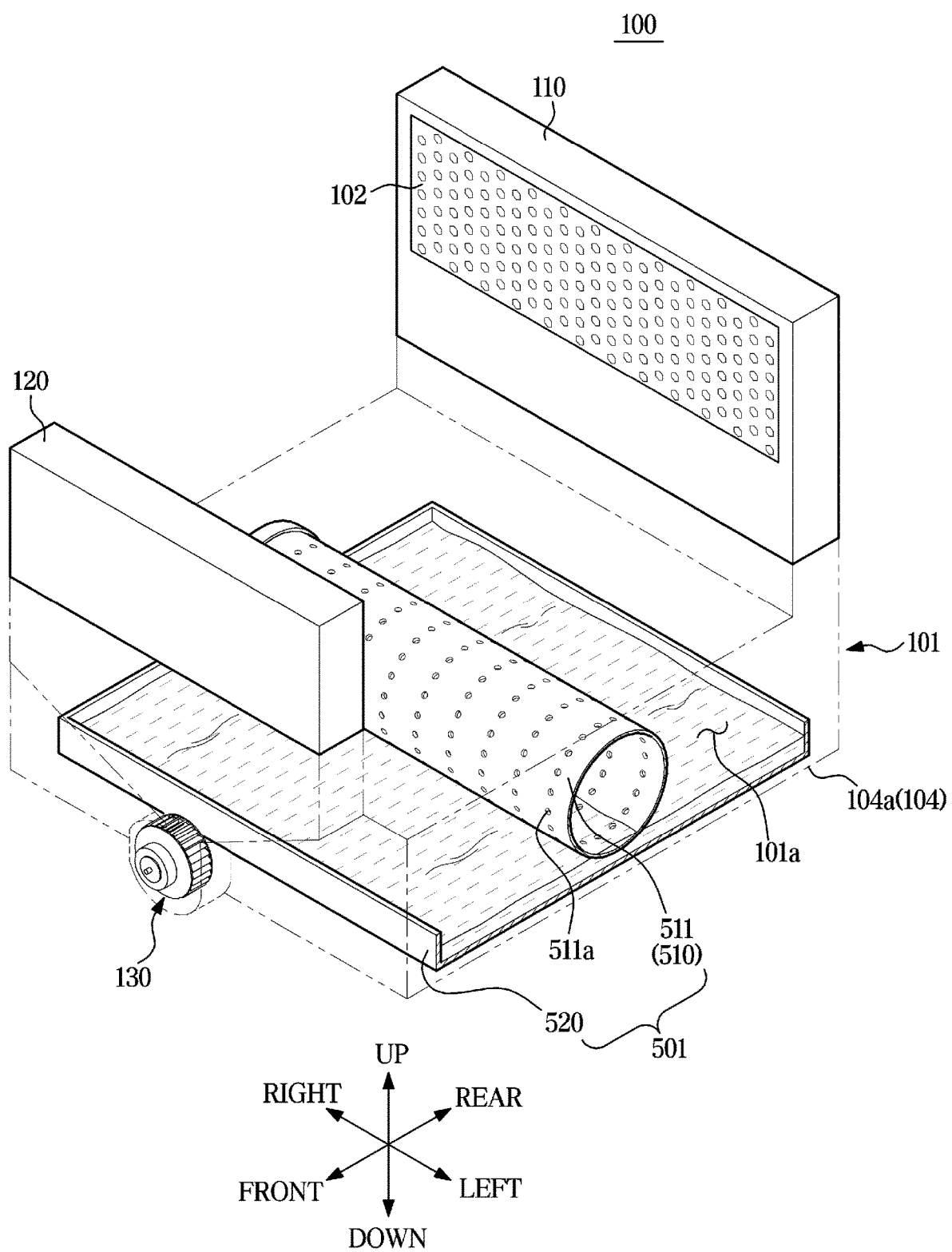

FIGS. 12 to 14 show oil mist filters according to various embodiments of the disclosure in ventilators according to various embodiments of the disclosure. FIGS. 12 to 14 show a case in which oil mist filters are provided in the ventilator 100 shown in FIG. 2, as an example. However, the disclosure is not limited to this. Oil mist filters 301, 401, and 501 shown in FIGS. 12 to 14 may be provided in the ventilators 100', 100-1, 100-2, and 100-3 shown in FIGS. 3, 4, 8, 9, and 11. The above-described content may be also applied to the ventilator and the oil mist filters 301, 401, and 501 shown in FIGS. 12 to 14 unless the following content is in conflict with the above-described content or unless the context clearly dictates otherwise.

Referring to FIG. 12, the oil mist filter 301 may include a filtering member 310 to which oil mist separated from air attaches, and an ionizer 320 for charging oil mist of polluted air.

The filtering member 310 may be in contact with air flowing along the inside of the ventilator body 101. The filtering member 310 may be positioned on the flow path 101a.

The filtering member 310 may be made of a conductive material (for example, aluminum, copper, stainless steel, etc.). The filtering member 310 may be made of a metal material.

The filtering member 310 may include a plate 311. The plate 311 may be substantially in a shape of a quadrangular flat plate. The plate 311 may be positioned in parallel to a direction of an air current flowing along the flow path 101a. More specifically, the plate 311 may be installed inside the housing 104 (for example, the purifier accommodating portion 104a), and may be positioned vertically or horizontally to be parallel to the direction of an inside air current of the housing 104 (for example, the purifier accommodating portion 104a), although not limited thereto. The filtering member 310 may include a general heat sink including a plurality of fins, a refrigerant pipe, etc.

The ionizer 320 may be in contact with air flowing along the inside of the ventilator body 101. The ionizer 320 may be positioned on the flow path 101a. The ionizer 320 may be positioned on the flow path 101a upstream from the filtering member 310 (for example, the plate 311). The ionizer 320 may be positioned inside the purifier accommodating portion 104a, although not limited thereto. However, the ionizer 320 may be positioned inside the inhalation duct accommodating portion 104b and/or inside the inhalation duct 110.

The ventilator 100 may include a power supply 330 provided outside or inside the ventilator body 101 to supply power to the ionizer 320 and/or charge the plate 311. The power supply 330 may be electrically connected to the ionizer 320 and/or the plate 311.

The ionizer 320 may charge oil mist in air flowing through the flow path 101a from the inlet 102. The charged oil mist may move toward the charged filtering member 310 (for example, the plate 311), and then attach onto the surface of the filtering member 310 by electrostatic attraction. The filtering member 310 may take away heat from the attached oil mist to condense the oil mist. That is, the condensed oil mist may attach to the surface of the filtering member 310 (for example, the plate 311). Because the oil mist attaches to the surface of the filtering member 310, is condensed and becomes oil drops, the oil mist may be removed from air without returning to air although electricity is no longer supplied to the filtering member 310 (for example, the plate 311) and the filtering member 310 is not in a charged state.

Referring to FIG. 13, the oil mist filter 401 may include a filtering member 410 to which oil mist separated from air attaches, a water tank 420 which is positioned below the filtering member 410 and in which water is stored, and a water vapor generator 430 for vaporizing the water stored in the water tank 420.

The filtering member 410 may be in contact with air flowing along the inside of the ventilator body 101. The filtering member 410 may be positioned on the flow path 101a.

The filtering member 410 may be made of a heat conductive material. The filtering member 410 may be made of a metal material (for example, aluminum, copper, stainless steel, etc.), although not limited thereto. However, the filtering member 210 may be made of plastic, glass, etc.

The filtering member 410 may include a plate 411. The plate 411 may be substantially in a shape of a quadrangle as seen in the up-down direction. The plate 411 may be positioned in parallel to a direction of an air current flowing along the flow path 101a. More specifically, the plate 411 may be installed inside the housing 104 (for example, the purifier accommodating portion 104a), and may be positioned horizontally in such a way as to be parallel to a direction of an air current flowing along the inside of the housing 104.

The water tank 420 may be provided below the filtering member 410. The water tank 420 may be detachably installed inside the housing 104 (for example, the purifier accommodating portion 104a). Water may be stored in the water tank 420.

The water vapor generator 430 may be installed inside the housing 104 (for example, the purifier accommodating portion 104a). The water vapor generator 430 may operate by receiving power from an external power supply (or a "power supply portion") of the ventilator body 101. The water vapor generator 430 may receive water stored in the water tank 420. At least one portion of the water vapor generator 430 may sink into water stored in the water tank 420. The water vapor generator 430 may vaporize water by using heat or ultrasonic waves, although not limited thereto. However, the water vapor generator 430 may generate water vapor by various mechanisms.

Water vapor generated by the water vapor generator 430 may be mixed with oil mist and then condensed on the surface of the filtering member 410 (for example, the plate 411). Accordingly, the oil mist may be removed from polluted air. Also, the oil mist may be condensed by directly contacting water stored in the water tank 420 and thereby removed from the polluted air.

The filtering member 410 (for example, the plate 411) may include a guide curved surface 411a for guiding water drops containing condensed oil attached to the surface of the filtering member 410 to the water tank 420. The guide curved surface 411a may include a plurality of guide curved surfaces 411a. More specifically, the guide curved surface 411a may form a bottom of the filtering member 410, and may be a curved surface getting closer to the water tank 420 toward the front direction from a rear end of the filtering member 410 or toward the rear direction from a front end of the filtering member 410.

One end of the guide curved surface 411a, being closet to the water tank 420, may be spaced a predefined gap t away from the surface of water stored in the water tank 420. Air of the flow path 101a may flow through the gap t between the end of the guide curved surface 411a and the surface of water.

Referring to FIG. 14, an oil mist filter 501 may include a filtering member 510 to which oil mist separated from water attaches, and a water tank 520 positioned below the filtering member 510 and storing water.

The filtering member 510 may be in contact with air flowing through the inside of the ventilator body 101. The filtering member 510 may be positioned on the flow path 101a.

The filtering member 510 may be made of a heat conductive material. The filtering member 510 may be made of a metal material (for example, aluminum, copper, stainless steel, etc.), although not limited thereto. However, the filtering member 510 may be made of plastic, glass, etc.

The filtering member 510 may include a plurality of holes 511a formed in the surface. The plurality of holes 511a may be formed with a predefined depth from the surface of the filtering member 510, or may penetrate the filtering member 510.

The filtering member 510 may include a cylinder 511 having the plurality of holes 511a formed in the surface. The cylinder 511 may rotate with respect to its central axis. The oil mist filter 501 may include a rotation device (not shown) for rotating the cylinder 511 by receiving power from an external power supply (or a "power supply portion") of the ventilator body 101, wherein the rotation device may include a motor. The cylinder 511 may rotate by the rotation device. The cylinder 511 may be installed inside the housing 104 (for example, the purifier accommodating portion 104a), and the central axis of the cylinder 511 may be vertical to a direction of an inside air current of the housing 104 (for example, the purifier accommodating portion 104a).

The water tank 520 may be positioned below the filtering member 510. The water tank 520 may be detachably installed inside the housing 104 (for example, the purifier accommodating portion 104a). Water may be stored in the water tank 520.

At least one portion of the filtering member 510 (for example, the cylinder 511) may sink into water stored in the water tank 520. The cylinder 511 may rotate in a state in which at least one portion of the cylinder 511 sinks into water. Water stored in the water tank 520 may permeate into the plurality of holes 511a sinking into the water, and according to a rotation of the cylinder 511, the plurality of holes 511a may raise water of the water tank 520 up from the surface of water to expose the water to the flow path 101a. Also, the filtering member 510 (for example, the cylinder 511) may be cooled by water of the water tank 520.

The filtering member 510 (for example, the cylinder 511) may cause water permeated into the holes 511a to be in contact with oil mist, and the oil mist being in contact with the water permeated into the holes 511a may be condensed and removed from polluted air. Also, the oil mist may be condensed by directly contacting water stored in the water tank 520 and thereby removed from the polluted air. The oil mist may be condensed on the surface of the filtering member 510 (for example, the cylinder 511) kept cool by the water of the water tank 520, and thereby, the oil mist may be removed from the polluted air.

Another embodiment of the disclosure relates to a ventilation system.

The ventilation system according to another embodiment of the disclosure may include the same components as the ventilator of the cooking apparatus described above with reference to FIGS. 1 to 14.

Accordingly, a ventilator of the ventilation system according to another embodiment of the disclosure may be assigned the same reference numerals and names as those used for the components of the ventilator according to an embodiment of the disclosure. Accordingly, detailed components of the ventilator of the ventilation system according to another embodiment of the disclosure are described with reference to FIGS. 1 to 14.

Also, the ventilation system may further include a cooking apparatus having a heating device.

The heating device may be installed in a main body. The heating device may be detachably installed in the main body. The heating device may be selectively installed in the main body.

That is, the ventilation system may include a ventilator without including a cooking apparatus having a heating device. The ventilator and the heating device may be provided as separate apparatuses. The heating device may be controlled to interwork with another apparatus.

Detailed components of the heating device may be assigned the same reference numerals and names as those used for the components of the heating device of the cooking apparatus described above with reference to FIGS. 1 to 14. The ventilation system according to another embodiment of the disclosure may include a ventilator 100.

The ventilation system may include a main body 2.

The main body 2 may include a storage space formed thereinside and opening forward. The main body 2 may be coupled with a storage closet door 4 opening or closing the storage space and forming a front surface of the main body 2, although not limited thereto. The storage closet door 4 may be omitted.

The ventilation system according to another embodiment of the disclosure may include a cooking apparatus including a heating device 3.

The heating device 3 may be detachably coupled with an upper surface 2a of the main body 2, although a location of the heating device 3 is not limited thereto.

The ventilator 100 may include a ventilator body 101 including an inlet 102 for inhaling air containing oil mist generated in a cooking process using the heating device 3. The inlet 102 of the ventilator body 101 may inhale polluted air, and an outlet 103 of the ventilator body 101 may discharge air from a flow path 101a.

At least one portion of the ventilator body 101 may be positioned inside the main body 2.

The ventilator 100 may include a blower 130 for blowing air inhaled through the inlet 102. The blower 130 may form an air current inside the ventilator body 101.

The blower 130 may be positioned on the flow path 101.

The ventilator 100 may include an oil mist filter 201 positioned inside the ventilator body 101 and configured to remove oil mist from inhaled air by filtering the oil mist from the inhaled air.

The oil mist filter 201 may be made of a metal material, and include a filtering member 210, wherein filtered oil mist is attached on a surface of the filtering member 210. The filtering member 210 may filter oil mist.

The filtering member 210 may physically filter oil mist such that the oil mist is separated from air. For example, the filtering member 210 may be formed as a mesh net to filter oil mist.

In this case, no power may be supplied to the filtering member 210, and power may be supplied only to the blower 130.

The oil mist filter 201 may include a cooling device 220 for cooling the filtering member 210 by receiving power. Oil mist may be cooled and condensed on the filtering member 210.

The filtering member 210 may include a plate 211, and the cooling device 220 may include a Peltier device 221 for cooling the plate 211.

The flow path 101a may be formed inside the ventilator body 101. The oil mist filter 201 may be positioned on the flow path 101a upstream from the blower 130, although not limited thereto. However, the oil mist filter 201 may be positioned on the flow path 101a downstream from the blower 130.

The ventilator body 101 may include a housing 104 positioned inside the main body 2, and an inhalation duct 110 coupled with a side of the housing 104, and the inlet 102 may be formed at a portion of the inhalation duct 110, exposed to an upper space of the main body 2.

The oil mist filter 201 may be positioned inside the housing 104.

The oil mist filter 201 may be positioned inside the inhalation duct 110.

Also, the oil mist filter 201 may include an ionizer 320 for charging oil mist, and the filtering member 310 may include a plate 311 charged such that oil mist charged by the ionizer 320 is attached to the plate 311.

The plate 311 may be substantially in a shape of a quadrangular flat plate. The plate 311 may be positioned in parallel to a direction of an air current flowing along the flow path 101*a*. More specifically, the plate 311 may be positioned inside the housing 104 (for example, a purifier accommodating portion 104*a*), and may be positioned vertically or horizontally to be parallel to a direction of an air current inside the housing 104, although not limited thereto. The filtering member 310 may include a general heat sink including a plurality of fins, a refrigerant pipe, etc.

Also, an oil mist filter 401 may include a water tank 420 positioned below a filtering member 410, and a water vapor generator 430 for vaporizing water stored in the water tank 420. Water vapor may be mixed with oil mist and then attached on the surface of the filtering member 410.

The filtering member 410 may include a guide curved surface 411*a* for guiding water drops condensed on the surface of the filtering member 410 to the water tank 420.

The guide curved surface 411*a* may include a plurality of guide curved surfaces 411*a*. More specifically, the guide curved surface 411*a* may form a bottom of the filtering member 410, and may be a curved surface getting closer to the water tank 420 toward the front direction from a rear end of the filtering member 410 or toward the rear direction from a front end of the filtering member 410.

An oil mist filter 501 may include a water tank 520 which stores water and in which at least one portion of a filtering member 510 is accommodated, and a rotation device for rotating the filtering member 510.

The filtering member 510 may include a plurality of holes 511*a* formed in a surface of the filtering member 510, and the filtering member 510 may rotate by the rotation device to expose water permeated into the plurality of holes 511*a* to oil mist.

The ventilator body 101 may include an exhaust duct 120 coupled with another side of the housing 104. The exhaust duct 120 may include the outlet 103 configured to discharge air blown by the blower 130 toward the inlet 102.

The inhalation duct 110 may be positioned behind the heating device 3, and the exhaust duct 120 may be positioned in front of the heating device 3.

The ventilator 100 may be configured to discharge air toward a rear direction of the heating device 3 through the outlet 103 to form an air curtain, thereby preventing oil mist from diffusing to a user performing cooking in front of the heating device 3.

Also, a flow path 101*a*-1 of a ventilator 100-1 may be connected to (or communicate with) the heating device 3, and supply air blown by the blower 130 to the heating device 3. The heating device 3 may be positioned on the flow path 101*a*-1 of the ventilator 100-1.

Also, exhaust ducts 121 and 122 of a ventilator 100-2 may include a plurality of exhaust ducts 121 and 122. Each of the exhaust ducts 121 and 122 may be rotatable on a rotation shaft extending in a direction (for example, the up-down direction). Each of the plurality of exhaust ducts 121 and 122 may be coupled with a housing 104-2 in such a way as to be rotatable on the rotation shaft extending in the up-down direction.

The plurality of exhaust ducts 121 and 122 may include a first exhaust duct 121 and a second exhaust duct 122. An outlet formed in the first exhaust duct 121 is also referred to as a first outlet 103*a*, and an outlet formed in the second exhaust duct 122 is also referred to as a second outlet 103*b*. The inhalation duct 110 shown in FIG. 9 may include a single inhalation duct 110, although not limited thereto. The inhalation duct 110 may include a plurality of inhalation ducts (for example, first and second inhalation ducts) corresponding to the plurality of exhaust ducts 121 and 122.

So far, specific embodiments have been shown and described, however, the disclosure is not limited to these embodiments. It should be interpreted that various modifications may be made by one of ordinary skill in the technical art to which the disclosure belongs, without deviating from the gist of the technical concept of the disclosure, which is defined in the following claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A cooking apparatus comprising:
a main body comprising a heating device; and
a ventilator comprising:
  a ventilator body including an inlet configured to inhale air containing an oil mist generated during a cooking process and an outlet configured to discharge the air blown by a blower toward the inlet;
  a flow path formed inside the ventilator body, connecting the inlet to the outlet;
  the blower configured to blow the inhaled air from the inlet, and positioned between an oil mist filter and the outlet; and
  the oil mist filter provided on the flow path, and configured to remove the oil mist from inhaled air by filtering the oil mist from the inhaled air,
  the ventilator body comprises:
    a housing positioned inside the main body; and
    an inhalation duct coupled with a side of the housing, and
  wherein the inlet is formed at a portion of the inhalation duct exposed to an upper space of the main body.

2. The cooking apparatus of claim 1, wherein the oil mist filter comprises a filtering member formed of a metal material and having a surface to which the filtered oil mist attaches.

3. The cooking apparatus of claim 2, wherein the oil mist filter further comprises a cooling device configured to receive power to cool the filtering member, and
wherein the oil mist is condensed to the filtering member.

4. The cooking apparatus of claim 3, wherein:
the filtering member comprises a plate, and
the cooling device comprises a Peltier device configured to cool the plate.

5. The cooking apparatus of claim 2, wherein:
the oil mist filter further comprises an ionizer configured to charge the oil mist, and
the filtering member comprises a plate that is charged and to which the oil mist charged by the ionizer attaches.

6. The cooking apparatus of claim 2, wherein
the oil mist filter further comprises
a water tank positioned below the filtering member, and
a water vapor generator configured to vaporize water stored in the water tank, and
the vaporized water mixes with the oil mist and attaches to the surface of the filtering member.

7. The cooking apparatus of claim 6, wherein the filtering member comprises a guide curved surface configured to guide water drops condensed on the surface of the filtering member to the water tank.

8. The cooking apparatus of claim 2, wherein:

the oil mist filter further comprises:

a water tank configured to store water into which at least a portion of the filtering member, and a rotation device configured to rotate the filtering member, the filtering member comprises a plurality of holes formed in the surface of the filtering member, and the filtering member is configured to rotate, by the rotating device, to expose water permeated into the plurality of holes to the oil mist.

9. The cooking apparatus of claim 1, wherein:

the oil mist filter is located on the flow path upstream from the blower.

10. The cooking apparatus of claim 1, wherein the oil mist filter is installed inside the housing.

11. The cooking apparatus of claim 1, wherein the oil mist filter is installed inside the inhalation duct.

12. The cooking apparatus of claim 1, wherein:

the ventilator body further comprises an exhaust duct coupled with another side of the housing, and the exhaust duct includes the outlet.

13. The cooking apparatus of claim 12, wherein:

the inhalation duct is positioned behind the heating device, and the exhaust duct is positioned in front of the heating device.

14. The cooking apparatus of claim 13, wherein the ventilator is configured to discharge air toward a rear direction of the heating device through the outlet to form an air curtain to prevent oil mist from diffusing to a user performing cooking in front of the heating device.

15. A cooking apparatus comprising:

a main body;

a heating device including a heating portion; and a ventilator configured to inhale polluted air generated in a cooking process using the heating device, wherein the ventilator comprises:

a ventilator body including an inlet and an outlet;

a flow path connecting the inlet to the outlet;

a blower provided on the flow path and configured to form an air current, and positioned between an oil mist filter and the outlet; and the oil mist filter including a filtering member being in contact with air blown by the blower and flowing along the flow path, and a Peltier device configured to cool the filtering member and condense oil mist, the ventilator body comprises:

a housing positioned inside the main body; and an inhalation duct coupled with a side of the housing, and wherein the inlet is formed at a portion of the inhalation duct exposed to an upper space of the main body.

16. The cooking apparatus of claim 15, wherein the blower and the oil mist filter are positioned below the heating device.

17. The cooking apparatus of claim 15, wherein the ventilator is positioned above the heating device.

18. The cooking apparatus of claim 15, wherein the outlet discharges air toward the inlet to move polluted air to the inlet.

* * * * *